(12) United States Patent
Jones

(10) Patent No.: US 11,550,874 B2
(45) Date of Patent: Jan. 10, 2023

(54) FUTURE RELIABILITY PREDICTION BASED ON SYSTEM OPERATIONAL AND PERFORMANCE DATA MODELLING

(71) Applicant: Hartford Steam Boiler Inspection and Insurance Company, Hartford, CT (US)

(72) Inventor: Richard B. Jones, Georgetown, TX (US)

(73) Assignee: HARTFORD STEAM BOILER INSPECTION AND INSURANCE COMPANY, Hartford, CT (US)

( * ) Notice: Subject to any disclaimer, the term of this patent is extended or adjusted under 35 U.S.C. 154(b) by 565 days.

(21) Appl. No.: 16/566,845

(22) Filed: Sep. 10, 2019

(65) Prior Publication Data

US 2020/0004802 A1 Jan. 2, 2020

Related U.S. Application Data

(63) Continuation of application No. 14/684,358, filed on Apr. 11, 2015, now Pat. No. 10,409,891.

(Continued)

(51) Int. Cl.
| | |
|---|---|
| G06F 17/18 | (2006.01) |
| G06Q 10/06 | (2012.01) |
| G06F 111/10 | (2020.01) |

(52) U.S. Cl.
CPC ......... *G06F 17/18* (2013.01); *G06Q 10/0635* (2013.01); *G06F 2111/10* (2020.01); *Y02P 90/845* (2015.11)

(58) Field of Classification Search
CPC . G06F 17/18; G06F 2111/10; G06Q 10/0635; G06Q 10/00; G06Q 50/26;
(Continued)

(56) References Cited

U.S. PATENT DOCUMENTS

| | | |
|---|---|---|
| 5,339,392 A | 8/1994 | Risberg et al. |
| 6,085,216 A | 7/2000 | Huberman et al. |
| | (Continued) | |

FOREIGN PATENT DOCUMENTS

| | | |
|---|---|---|
| CA | 2845827 | 2/2013 |
| CN | 1199462 | 11/1998 |
| | (Continued) | |

OTHER PUBLICATIONS

Sato, Danilo et al.; Continuous Delivery for Machine Learning; Sep. 19, 2019; 41 pages.

(Continued)

*Primary Examiner* — Kandasamy Thangavelu
(74) *Attorney, Agent, or Firm* — Greenberg Traurig LLP

(57) ABSTRACT

Systems, methods, and apparatuses for improving future reliability prediction of a measurable system by receiving operational and performance data, such as maintenance expense data, first principle data, and asset reliability data via an input interface associated with the measurable system. A plurality of category values may be generated that categorizes the maintenance expense data by a designated interval using a maintenance standard that is generated from one or more comparative analysis models associated with the measurable system. The estimated future reliability of the measurable system is determined based on the asset reliability data and the plurality of category values and the results of the future reliability are displayed on an output interface.

17 Claims, 16 Drawing Sheets

Related U.S. Application Data

(60) Provisional application No. 61/978,683, filed on Apr. 11, 2014.

(58) Field of Classification Search
CPC ...... G06Q 10/10; G06Q 50/06; Y02P 90/845; Y02E 30/30; Y04S 10/50
See application file for complete search history.

(56) References Cited

U.S. PATENT DOCUMENTS

| | | |
|---|---|---|
| 6,832,205 B1 | 12/2004 | Aragones et al. |
| 6,847,976 B1 | 1/2005 | Peace |
| 6,988,092 B1 | 1/2006 | Tang et al. |
| 7,039,654 B1 | 5/2006 | Eder |
| 7,233,910 B2 | 6/2007 | Hileman et al. |
| 7,239,984 B2 | 7/2007 | Moessner |
| 7,313,550 B2 | 12/2007 | Kulkarni et al. |
| 7,447,611 B2 | 11/2008 | Fluegge et al. |
| 7,469,228 B2 | 12/2008 | Bonissone et al. |
| 7,536,364 B2 | 5/2009 | Subu et al. |
| 7,966,150 B2 | 6/2011 | Smith et al. |
| 8,050,889 B2 | 11/2011 | Fluegge et al. |
| 8,055,472 B2 | 11/2011 | Fluegge et al. |
| 8,060,341 B2 | 11/2011 | Fluegge et al. |
| 8,195,484 B2 | 6/2012 | Jones et al. |
| 8,346,691 B1 | 1/2013 | Subramanian et al. |
| 8,548,833 B2 | 10/2013 | Jones et al. |
| 8,554,588 B2 | 10/2013 | Jones et al. |
| 8,554,589 B2 | 10/2013 | Jones et al. |
| 8,595,036 B2 | 11/2013 | Jones et al. |
| 8,676,610 B2 | 3/2014 | Jones et al. |
| 8,686,364 B1 | 4/2014 | Little, III et al. |
| 8,719,059 B2 | 5/2014 | Jones et al. |
| 8,812,331 B2 | 8/2014 | Jones et al. |
| 9,069,725 B2 | 6/2015 | Jones |
| 9,111,212 B2 | 8/2015 | Jones |
| 9,536,364 B2 | 1/2017 | Talty et al. |
| 9,646,262 B2 | 5/2017 | Phillipps et al. |
| 9,659,254 B2 | 5/2017 | Achin et al. |
| 10,198,339 B2 | 2/2019 | Salunke et al. |
| 10,317,854 B2 | 6/2019 | Nakagawa et al. |
| 10,339,695 B2 | 7/2019 | Petkov et al. |
| 10,409,891 B2 | 9/2019 | Jones |
| 10,452,992 B2 | 10/2019 | Lee et al. |
| 10,557,840 B2 | 2/2020 | Jones |
| 10,638,979 B2 | 5/2020 | Gupta et al. |
| 10,739,741 B2 | 8/2020 | Wenzel et al. |
| 11,007,891 B1 | 5/2021 | Kamal et al. |
| 2003/0171879 A1* | 9/2003 | Pittalwala ............ F17D 5/00 702/34 |
| 2003/0216627 A1 | 11/2003 | Lorenz et al. |
| 2004/0122625 A1* | 6/2004 | Nasser ............ G05B 23/0218 702/185 |
| 2004/0172401 A1 | 9/2004 | Peace |
| 2004/0186927 A1 | 9/2004 | Eryurek et al. |
| 2004/0254764 A1 | 12/2004 | Wetzer et al. |
| 2005/0022168 A1 | 1/2005 | Zhu et al. |
| 2005/0038667 A1 | 2/2005 | Hileman et al. |
| 2005/0125322 A1 | 6/2005 | Lacomb et al. |
| 2005/0131794 A1 | 6/2005 | Lifson |
| 2005/0187848 A1 | 8/2005 | Bonissone et al. |
| 2006/0080040 A1 | 4/2006 | Garczarek et al. |
| 2006/0247798 A1 | 11/2006 | Subbu et al. |
| 2006/0259352 A1 | 11/2006 | Hileman et al. |
| 2006/0271210 A1 | 11/2006 | Subbu et al. |
| 2007/0035901 A1 | 2/2007 | Albrecht et al. |
| 2007/0105238 A1 | 5/2007 | Mandl et al. |
| 2007/0109301 A1 | 5/2007 | Smith |
| 2008/0015827 A1* | 1/2008 | Tryon, III ............ G06F 11/008 703/2 |
| 2008/0104624 A1 | 5/2008 | Narasimhan et al. |
| 2008/0201181 A1 | 8/2008 | Hileman et al. |
| 2008/0300888 A1* | 12/2008 | Dell'Anno ............ G06Q 30/02 705/1.1 |
| 2009/0093996 A1* | 4/2009 | Fluegge ............ G06Q 50/06 702/182 |
| 2009/0143045 A1 | 6/2009 | Graves et al. |
| 2009/0287530 A1 | 11/2009 | Watanabe et al. |
| 2010/0036637 A1 | 2/2010 | Miguelanez et al. |
| 2010/0152962 A1* | 6/2010 | Bennett ............ G07C 5/0808 701/31.4 |
| 2010/0153328 A1 | 6/2010 | Cormode et al. |
| 2010/0262442 A1* | 10/2010 | Wingenter ......... G06Q 30/0283 705/7.38 |
| 2011/0153270 A1 | 6/2011 | Hoffman |
| 2011/0246409 A1 | 10/2011 | Mitra |
| 2012/0296584 A1 | 11/2012 | Itoh |
| 2013/0046727 A1 | 2/2013 | Jones |
| 2013/0173325 A1 | 7/2013 | Coleman et al. |
| 2013/0231904 A1 | 9/2013 | Jones |
| 2013/0262064 A1 | 10/2013 | Mazzaro et al. |
| 2015/0278160 A1 | 10/2015 | Jones |
| 2015/0294048 A1 | 10/2015 | Jones |
| 2015/0309963 A1 | 10/2015 | Jones |
| 2015/0309964 A1 | 10/2015 | Jones |
| 2015/0331023 A1 | 11/2015 | Hwang et al. |
| 2017/0178332 A1 | 6/2017 | Lindner et al. |
| 2018/0189667 A1 | 7/2018 | Tsou et al. |
| 2018/0329865 A1 | 11/2018 | Jones |
| 2019/0034473 A1 | 1/2019 | Jha et al. |
| 2019/0050510 A1 | 2/2019 | Mewes et al. |
| 2019/0108561 A1 | 4/2019 | Shivashankar et al. |
| 2019/0213446 A1 | 7/2019 | Tsou et al. |
| 2019/0271673 A1 | 9/2019 | Jones |
| 2019/0287039 A1 | 9/2019 | Ridgeway |
| 2019/0303662 A1 | 10/2019 | Madhani et al. |
| 2019/0303795 A1 | 10/2019 | Khiari et al. |
| 2020/0074269 A1 | 3/2020 | Trygg et al. |
| 2020/0104651 A1 | 4/2020 | Jones |
| 2020/0160180 A1 | 5/2020 | Lehr et al. |
| 2020/0160229 A1 | 5/2020 | Atcheson |
| 2020/0167466 A1 | 5/2020 | Cheng |
| 2020/0175424 A1 | 6/2020 | Kursun |
| 2020/0182847 A1 | 6/2020 | Jones |
| 2020/0201727 A1 | 6/2020 | Nie et al. |
| 2020/0311615 A1 | 10/2020 | Jammalamadaka et al. |
| 2020/0349434 A1 | 11/2020 | Zhang et al. |
| 2020/0364561 A1 | 11/2020 | Ananthanarayanan et al. |
| 2020/0387833 A1 | 12/2020 | Kursun |
| 2020/0387836 A1 | 12/2020 | Nasr-Azadani et al. |
| 2020/0402665 A1 | 12/2020 | Zhang et al. |
| 2021/0034581 A1 | 2/2021 | Boven et al. |
| 2021/0042643 A1 | 2/2021 | Hong et al. |
| 2021/0110313 A1 | 4/2021 | Jones |
| 2021/0136006 A1 | 5/2021 | Casey et al. |

FOREIGN PATENT DOCUMENTS

| | | |
|---|---|---|
| CN | 1553712 | 12/2004 |
| CN | 1770158 | 5/2006 |
| CN | 102081765 | 6/2011 |
| CN | 103077428 A * | 5/2013 |
| CN | 104090861 | 10/2014 |
| CN | 10425488 | 12/2014 |
| CN | 106471475 | 3/2017 |
| CN | 104254848 | 4/2017 |
| CN | 106919539 | 7/2017 |
| CN | 106933779 | 7/2017 |
| CN | 109299156 | 2/2019 |
| CN | 110378386 | 10/2019 |
| CN | 110411957 | 11/2019 |
| CN | 110458374 | 11/2019 |
| CN | 110543618 | 12/2019 |
| CN | 110909822 | 3/2020 |
| CN | 111080502 | 4/2020 |
| CN | 111157698 | 5/2020 |
| CN | 111709447 | 9/2020 |
| CN | 112257963 | 1/2021 |
| EP | 2745213 | 6/2014 |
| EP | 2770442 | 8/2014 |
| EP | 3129309 | 2/2017 |
| EP | 3483797 | 5/2019 |
| EP | 3493079 | 6/2019 |

(56) References Cited

FOREIGN PATENT DOCUMENTS

| | | | | |
|---|---|---|---|---|
| EP | 3514700 | | 7/2019 | |
| JP | 2004-068729 | | 3/2004 | |
| JP | 2004145496 | A * | 5/2004 | ............ Y04S 10/50 |
| JP | 2004191359 | A * | 7/2004 | ............ Y02E 30/30 |
| JP | 2004-530967 | | 10/2004 | |
| JP | 2007-522477 | | 8/2007 | |
| JP | 2007-522658 | | 8/2007 | |
| JP | 3968039 | B2 * | 8/2007 | ............ Y04S 10/50 |
| JP | 2008-503277 | | 2/2008 | |
| JP | 442492 | | 2/2008 | |
| JP | 4042492 | | 2/2008 | |
| JP | 2008-166644 | | 7/2008 | |
| JP | 2008191900 | A * | 8/2008 | |
| JP | 2009098093 | A * | 5/2009 | ............ Y02E 30/30 |
| JP | 2009-253362 | | 10/2009 | |
| JP | 2010-502308 | | 1/2010 | |
| JP | 2010-250674 | | 11/2010 | |
| JP | 2011048688 | A * | 3/2011 | ............ G06Q 10/10 |
| JP | 2012-155684 | | 8/2012 | |
| JP | 2014-170532 | | 9/2014 | |
| JP | 5592813 | | 9/2014 | |
| JP | 6592813 | | 9/2014 | |
| JP | 5982489 | | 8/2016 | |
| JP | 2017-514252 | | 6/2017 | |
| JP | 6297855 | | 3/2018 | |
| JP | 2018113048 | | 7/2018 | |
| JP | 2018116712 | | 7/2018 | |
| JP | 2018116713 | | 7/2018 | |
| JP | 2018116714 | | 7/2018 | |
| JP | 2018136945 | | 8/2018 | |
| JP | 2018139109 | | 9/2018 | |
| JP | 6527976 | | 5/2019 | |
| JP | 6686056 | | 4/2020 | |
| KR | 101010717 | B1 * | 1/2011 | ............ G06Q 50/06 |
| KR | 10-2012-0117847 | | 10/2012 | |
| KR | 101329395 | B1 * | 11/2013 | ............ G06Q 50/26 |
| KR | 20140092805 | | 7/2014 | |
| KR | 10-2052217 | | 12/2019 | |
| WO | 2007/117233 | | 10/2007 | |
| WO | 2008/126209 | | 7/2010 | |
| WO | 2011/080548 | | 7/2011 | |
| WO | 2011/089959 | | 7/2011 | |
| WO | 2013/028532 | | 2/2013 | |
| WO | 2015/157745 | | 10/2015 | |
| WO | 2019/049546 | | 3/2019 | |
| WO | 2020/260927 | | 12/2020 | |

OTHER PUBLICATIONS

Saucedo, Alejandro; The Anatomy of Production ML; Dec. 2020; 58 pages.
Sadik, MD. Shiblee; Online Detection of Outliers for Data Streams; 2013; A Dissertation Submitted to the Graduate Faculty; 289 pages.
Suresh, Anuganti; How to Remove Outliers for Machine Learning; Nov. 30, 2020; 33 pages.
Sharifzadeh, Mahdi et al.; Machne-Learning Methods for Integrated Renewable Power Generation: A Comparative Study of Artificial Neural Networks, Support Vector Regression, and Gaussian Process Regression; Jul. 25, 2018; 26 pages; Elsevier Ltd.
Japanese Patent Office; Notice of Final Decision of Rejection, issued in connection to application No. 2017-504630; dated Dec. 3, 2019; 11 pages; Japan.
Japanese Patent Office; Notice of Reasons for Rejection, issued in connection to JP2018-029940; 4 pages; dated Apr. 17, 2019; Japan.
Japanese Patent Office; Notice of Reasons for Rejection, issued in connection to JP2018-029941; 7 pages; dated Apr. 17, 2019; Japan.
Japanese Patent Office; Notice of Reasons for Rejection, issued in connection to JP2018-029944; 4 pages; dated May 14, 2019, 2019; Japan.
Japanese Patent Office; Notice of Reasons for Rejection, issued in connection to JP2018-029943; 7 pages; dated May 8, 2019; Japan.
European Patent Office; Extended European Search Report, issued in connection to EP18192489.5; 7 pages; dated Apr. 26, 2019; Europe.
State Intellectual Property Office of the People's Republic of China; Notification of the Second Office Action, issued in connection to CN201580027842.9; dated May 28, 2019; 9 pages; China.
China National Intellectual Property Administration; Notification of the Second Office Action and Search Report, issued in connection with CN201710142639.7; dated Aug. 20, 2019; 23 pages; China.
Qing, Liu; Measurement Error of Thermistor Compensated by CMAC-Based Nonlinear Inverse Filter; Journal of Instrument; vol. 26, No. 10; Oct. 30, 2005; pp. 1077-1080; China.
Hui, Liu; RSSI-Based High-Precision Indoor Three-Dimensional Spatial Positioning Algorithm; Chinese Master's Theses Full-Text Database Information Science and Technology, No. 8; Aug. 15, 2011; 4 pages.
China National Intellectual Property Administration; Third Office Action, issued in connection to application No. 201710142639.7; dated Mar. 5, 2020; 8 pages; China.
Canadian Intellectual Property Office; Examiner's Report, issued in connection to application No. 2,945,543; dated May 12, 2020; 4 pages; Canada.
Indian Patent Office; First Examination Report, issued in connection to application No. 389/KOLNP/2014; dated Jan. 27, 2020; 7 pages; India.
China National Intellectual Property Administration; Rejection Decision, issued in connection to application No. 201710142741.7; dated Jan. 15, 2020; 8 pages; China.
Canadian Intellectual Property Office; Examination Report, issued in connection to application No. 2843276; dated Feb. 3, 2020; 5 pages; Canada.
Indian Patent Office; First Examination Report, issued in connection to application No. 215/KOL/2014; dated Feb. 21, 2020; 7 pages; India.
Canadian Intellectual Property Office; Examiner's Report, issed in connection to application No. 2845827; dated Feb. 19, 2020; 7 pages; Canada.
China National Intellectual Property Administration; Rejection Decision, issued in connection to application No. 201580027842.9; dated Feb. 3, 2020; 15 pages; China.
European Patent Office; Communication Pursuant to Article 94(3) EPC, issued in connection to application No. EP18192489.5; dated Jul. 12, 2021; 8 pages; Europe.
European Patent Office; Communication Pursuant to Article 94(3) EPC, issued in connection to application No. EP15776851.6; dated Jun. 4, 2021; 5 pages; Europe.
Raj S, Stephen et al.; Detection of Outliers in Regression Model for Medical Data; 2017; International Journal of Medical Research and Health Sciences; pp. 50-56.
Korean Intellectual Property Office; Notification of Provisional Rejection; dated Aug. 20, 2020; 11 pages; Korea.
China National Intellectual Property Administration; Rejection Decision, issued in connection to application No. 201710142639.7; dated Aug. 25, 2020;—pages; China.
Nguyen, Minh N.H. et al.; Outliers Detection and Correction for Cooperative Distributed Online Learning in Wireless Sensor Network; Jan. 11, 2017; pp. 349-353; IEEE Xplore.
Santhanam, T. et al.; Comparison of K-Means Clustering and Statistical Outliers in Reduction Medical Datasets; Nov. 27, 2014; 6 pages; IEEE Xplore.
Yoon, Tae Bok et al.; Improvement of Learning Styles Diagnosis Based on Outliers Reduction of User Interface Behaviors; Dec. 10, 2007; pp. 497-502; IEEE Xplore.
North American Electric Reliavility Council; Predicting Unit Availability: Top-Down Analyses for Predicting Electirc Generating Unit Availavility; Predicted Unit Availability Task Force, North American Electirc Reliability Council; US; Jun. 1991; 26 pages.
Cipolla, Roberto et al.; Motion from the Frontier of Curved Surfaces; 5th International Conference on Computer Vision; Jun. 20-23, 1995; pp. 269-275.
Richwine, Robert R.; Optimum Economic Performance: Reducing Costs and Improving Performance of Nuclear Power Plants; Rocky Mountain Electrical League, AIP-29; Keystone Colorado; Sep. 13-15, 1998; 11 pages.

(56) References Cited

OTHER PUBLICATIONS

Richwine, Robert R.; Setting Optimum Economic Performance Goals to Meet the Challenges of a Competitive Business Environment; Rocky Mountain Electrical League; Keystone, Colorado; Sep. 13-15, 1998; 52 pages.

Int'l Atomic Energy Agency; Developing Economic Performance Systems to Enhance Nuclear Poer Plant Competitiveness; International Atomic Energy Agency; Technical Report Series No. 406; Vienna, Austria; Feb. 2002; 92 pages.

Richwine, Robert R.; Optimum Economic Availability; World Energy Council; Performance of Generating Plant Committee—Case Study of the Month Jul. 2002; Londong, UK; Jul. 2002; 3 pages.

World Energy Council; Perfrmance of Generating Plant: New Realities, New Needs; World Energy Council; London, UK; Aug. 2004; 309 pages.

Richwine, Robert R.; Maximizing Avilability May Not Optimize Plant Economics; World Energy Council, Performance of Generating Plant Committee—Case Study of the Month Oct. 2004; London, UK; Oct. 2004; 5 pages.

Curley, Michael et al.; Benchmarking Seminar; North American Electirc Reliavility Council; San Diego, CA; Oct. 20, 2006; 133 pages.

Richwine, Robert R.; Using Reliability Data in Power Plant Performance Improvement Programs; ASME Power Division Conference Workshop; San Antonio, TX; Jul. 16, 2007; 157 pages.

Gang, Lu et al.; Balance Programming Between Target and Chance with Application in Building Optimal Bidding Strategies for Generation Companies; International Conference on Intelligent Systems Applications to Power Systems; Nov. 5-8, 2007; 8 pages.

U.S. Patent and Trademark Office; Notice of Allowance and Fee(s) Due; issued in connection with U.S. Appl. No. 11/801,221; dated Jun. 23, 2008; 8 pages; US.

U.S. Patent and Trademark Office; Supplemental Notice of Allowability; issued in connection with U.S. Appl. No. 11/801,221; dated Sep. 22, 2008; 6 pages; US.

U.S. Patent and Trademark Office; Non-Final Office Action, issued against U.S. Appl. No. 12/264,117; dated Sep. 29, 2010' 19 pages; US.

U.S. Patent and Trademark Office; Non-Final Office Action, issued against U.S. Appl. No. 12/264,127; dated Sep. 29, 2010; 18 pages; US.

U.S. Patent and Trademark Office; Non-Final Office Action, issued against U.S. Appl. No. 12/264,136; dated Sep. 29, 2010; 17 pages; US.

U.S. Patent and Trademark Office; Interview Summary, issued in connection with U.S. Appl. No. 12/264,117; dated Mar. 3, 2011; 9 pages; US.

U.S. Patent and Trademark Office; Interview Summary, issued in connection with U.S. Appl. No. 12/264,136; dated Mar. 4, 2011; 9 pages; US.

U.S. Patent and Trademark Office; Ex Parte Quayle Action, issued in connection with U.S. Appl. No. 12/264,136; Apr. 28, 2011; 7 pages; US.

U.S. Patent and Trademark Office; Notice of Allowance and Fee(s) Due; issued in connection with U.S. Appl. No. 12/264,136; dated Jul. 26, 2011; 8 pages; US.

U.S. Patent and Trademark Office; Notice of Allowance and Fee(s) Due; issued in connection with U.S. Appl. No. 12/264,117; dated Aug. 23, 2011; 13 pages/ US.

U.S. Patent and Trademark Office; Notice of Allowance and Fee(s) Due; issued in connection with U.S. Appl. No. 12/264,127; dated Aug. 25, 2011; 12 pages; US.

U.S. Patent and Trademark Office; Non-Final Office Action, Issued against U.S. Appl. No. 13/772,212; dated Apr. 9, 2014; 20 pages; US.

European Patent Office, PCT International Search Report and Written Opinion, issued in connection to PCT/US2012/051390; dated Feb. 5, 2013; 9 pages; Europe.

Japanese Patent Office; Office Action, Issued against Application No. JP2014-527202; dated Oct. 13, 2015; Japan.

European Patent Office; Extended European Search Report, issued in connection to EP14155792.6; dated Aug. 18, 2014; 5 pages; Europe.

European Patent Office; Communication Pursuant to Article 94(3) EPC, issued in connection to EP14155792.6; dated May 6, 2015; 2 pages; Europe.

European Patent Office; Invitation Pursuant to Rule 137(4) EPC and Article 94(3) EPC, issued in connection to EP14155792.6; dated Jan. 3, 2018; 4 pages; Europe.

European Patent Office, Result of Consultation, issued in connection to EP14155792.6; dated Jun. 19, 2018; 3 pages; Europe.

European Patent Office; Communicaiton Pursuant to Article 94(3) EPC, issued in connection to EP12769196.2; dated May 6, 2015; 5 pages; Europe.

State Intellectual Property Office of the People's Republic of China; Notification of the First Office Action, issued in connection to CN201710142639.7; dated Sep. 29, 2018; 8 pages; China.

State Intellectual Property Office of the People's Republic of China; Notification of the First Office Action, issued in connection to CN201710142741.7; dated Sep. 4, 2018; 8 pages; China.

Canadian Intellectual Property Office; Examiner's Report, issued in connection to CA2845827; dated Jan. 28, 2019; 5 pages; Canada.

Canadian Intellectual Property Office; Examiner's Report, issued in connection to CA2845827; dated May 10, 2018; 5 pages; Canada.

Korean Intellectual Property Office; Notification of Provisional Rejection, issued in connection to KR10-2014-7007293; dated Oct. 16, 2018; 3 pages; Korea.

State Intellectual Property Office of the People's Republic of China; Notification of the Second Office Action, issued in connection to CN201410058245.X; dated Aug. 6, 2018; 11 pages; China.

State Intellectual Property Office of the People's Republic of China; Notification of the First Office Action, issued in connection to CN201410058245.X; dated Sep. 5, 2017; 20 pages; China.

Japanese Patent Office; Office Action, issued in connection to JP2018-029938; dated Dec. 4, 2018;—pages; Japan.

Daich Takatori, Improvement of Support Vector Machine by Removing Outliers and its Application to Shot Boundary Detection, Institute of Electronics, Information and Communication Engineers (IEICE) 19th Data Engineering Workshop Papers [online], Japan, IEICE Data Engineering Research Committee, Jun. 25, 2009, 1-7, ISSN 1347-4413.

The International Bureau of WIPO; PCT International Preliminary Report on Patentability, issued in connection to PCT/US2012/051390; dated Mar. 6, 2014; 6 pages; Switzerland.

United States Patent and Trademark Office; PCT International Search Report and Written Opinion, issued in connection to PCT/US15/25490; dated Jul. 24, 2015; 12 pages; US.

The International Bureau of WIPO; PCT International Preliminary Report on Patentability, issued in connection to PCT/US15/25490; dated Oct. 20, 2016; 7 pages; Switzerland.

European Patent Office; Communication Pursuant to Rules 70(2) and 70a(2) EPC, issued in connection to EP15776851.6; dated Mar. 13, 2018; 34 pages; Europe.

European Patent Office; Extended European Search Report, issued in connection to EP15776851.6; dated Feb. 22, 2018; 3 pages; Europe.

State Intellectual Property Office of the People's Republic of China; Notification of the First Office Action, issued in connection to CN201580027842.9; dated Jul. 12, 2018; 9 pages; China.

Japanese Patent Office; Notification of Reason for Rejection, issued in connection to JP2017-504630; dated Jan. 1, 2019; 13 pages; Japan.

Ford, AP. et al.; IEEE Strandard definitions for use in reporting electric generating unit reliability, availability and productivity; IEEE Power Engineering Society, Mar. 2007; 78 pages.

North American Electric Reliability Council; Predicting Generating Unit Reliability; Dec. 1995; 46 pages.

European Patent Office; Extended European Search Report, issued in connection to EP19153036.9; 8 pages; dated May 8, 2019; Europe.

Japanese Patent Office; Notice of Reasons for Rejection, issued in connection to JP2018-029939; 5 pages; dated Apr. 17, 2019; Japan.

(56) References Cited

OTHER PUBLICATIONS

Japanese Patent Office; Office Action, issued in connection to application No. 2020-065773; dated Mar. 9, 2021; 4 pages; Japan.
Korean Intellectual Property Office; Notification of Provisional Rejection, issued in connection to application No. 10-2014-0019597; dated Jun. 18, 2019; 7 pages; Korea.
Intellectual Property Office of India; Examination Report, issued in connection to application No. 201637036024; dated Feb. 25, 2021; 8 pages; India.
Canadian Intellectual Property Office; Examination Report, issued in connection to application No. 2843276; dated Feb. 22, 2021; 4 pages; Canada.
Korean Intellectual Property Office; Notification of Provisional Rejection, issued in connection to application No. 10-2016-7031635; dated Aug. 20, 2020; 11 pages; Korea.
China National Intellectual Property Administration; Rejection Decision, issued in connection to application No. 201710142639.7; dated Aug. 25, 2020; 10 pages; China.
European Patent Office; PCT International Search Report, issued in connection to application No. PCT/US2020/051627; dated Jan. 15, 2021; 4 pages; Europe.
European Patent Office; PCT Written Opinion of the International Searching Authority, issued in connection to application No. PCT/US2020/051627; dated Jan. 15, 2021; 5 pages; Europe.
Japanese Patent Office; Office Action, issued in connection to application No. 2020-065773; dated Jun. 22, 2021; 9 pages; Japan.
European Patent Office; PCT International Search Report, issued in connection to application No. PCT/US2021/022861; dated Jul. 9, 2021; 5 pages; Europe.
European Patent Office; PCT Written Opinion of the International Searching Authority, issued in connection to application No. PCT/US2021/022861; dated Jul. 9, 2021; 9 pages; Europe.
Rubin, Cynthia et al.; Machine Learning for New York City Power Grid; IEEE Transactions on Patters Analysis and Machine Intelligence; vol. 34, No. 2; IEEE Computer Society; Feb. 1, 2022; pp. 3285-3345; U.S.
Lazarevic, Aleksandar et al.; Feature Bagging for Outlier Detection; Proceedings of the 11th. ACM Sigkdd International Conference on Knowledge Discovery and Data Mining; Aug. 21, 2005; pp. 157-166; U.S.
Zhao, Yue et al.; DCSO: Dynamic Combination of Detector Scores for Outlier Ensembles: Cornell University Library; Nov. 23, 2019; 9 pages; U.S.
Canadian Intellectual Property Office; Examiner's Report, issued in connection to application No. 2,845,827; dated Aug. 10, 2021; 5 pages; Canada.
China National Intellectual Property Administration; Board Opinion, issued in connection to application No. 201710142741.7; dated Jan. 13, 2022; 7 pages; China.

\* cited by examiner

Data Compilation

| Client # | Plant Name | Study Year | Computed Mx Standard | Actual (Annualized) Mx Expense | Act Mx/Std Mx | Act/Mx/Std Mx:Decile | EFOR |
|---|---|---|---|---|---|---|---|
| 007111 | SMITH PLANT | 2002 | 19,793 | 11,182 | 0.57 | 1.00 | 7.15 |
| 007111 | SMITH PLANT | 2003 | 20,857 | 13,944 | 0.67 | 2.00 | 5.20 |
| 007111 | SMITH PLANT | 2004 | 20,514 | 13,060 | 0.64 | 1.00 | 7.48 |
| 007111 | SMITH PLANT | 2007 | 18,247 | 16,550 | 0.91 | 4.00 | 23.28 |
| 007111 | SMITH PLANT | 2009 | 18,413 | 18,958 | 1.03 | 6.00 | 25.19 |
| 007111 | SMITH PLANT | 2010 | 18,627 | 21,558 | 1.16 | 7.00 | 12.77 |
| 007111 | SMITH PLANT | 2011 | 18,881 | 36,340 | 1.93 | 9.00 | 7.10 |
| 007112 | BROWN PLANT | 2002 | 20,090 | 10,826 | 0.54 | 1.00 | 4.95 |
| 007112 | BROWN PLANT | 2003 | 20,681 | 14,775 | 0.72 | 2.00 | 6.79 |
| 007112 | BROWN PLANT | 2004 | 20,657 | 20,709 | 1.00 | 5.00 | 7.94 |
| 007112 | BROWN PLANT | 2007 | 18,368 | 18,599 | 1.01 | 5.00 | 23.80 |
| 007112 | BROWN PLANT | 2009 | 18,339 | 18,337 | 1.00 | 5.00 | 13.02 |
| 007112 | BROWN PLANT | 2010 | 17,297 | 28,940 | 1.67 | 9.00 | 7.98 |
| 007112 | BROWN PLANT | 2011 | 17,842 | 29,689 | 1.66 | 9.00 | 44.58 |
| 024100 | JONES PLANT | 2006 | 14,334 | 8,736 | 0.65 | 1.00 | 11.35 |
| 024100 | JONES PLANT | 2007 | 14,450 | 13,638 | 1.00 | 6.00 | 7.41 |
| 024100 | JONES PLANT | 2008 | 14,362 | 14,590 | 1.07 | 6.00 | 8.08 |
| 024100 | JONES PLANT | 2009 | 14,700 | 13,066 | 0.93 | 4.00 | 15.22 |
| 024101 | JONESY PLANT | 2006 | 14,382 | 8,639 | 0.64 | 1.00 | 8.21 |
| 024101 | JONESY PLANT | 2007 | 14,779 | 14,911 | 1.06 | 6.00 | 14.31 |
| 024101 | JONESY PLANT | 2008 | 14,271 | 15,770 | 1.17 | 7.00 | 3.64 |
| 024101 | JONESY PLANT | 2009 | 14,626 | 13,900 | 1.00 | 5.00 | 14.88 |

FIG. 2

Categorized Time Based Maintenance Data

| ActMx/StdMx | 1999 | 2000 | 2001 | 2002 | 2003 | 2004 | 2005 | 2006 | 2007 | 2008 | 2009 | 2010 | 2011 | 2012 | 2013 |
|---|---|---|---|---|---|---|---|---|---|---|---|---|---|---|---|
| Plant 1 | 5 | 7 | 9 | 9 | 9 | 3 | 1 | 2 | 3 | 2 | 3 | 5 | 4 | 6 | 4 |
| Plant 2 | 1 | 1 | 3 | 8 | 8 | 2 | 1 | 3 | 3 | 3 | 3 | 1 | 1 | 3 | 4 |
| Plant 3 |   |   |   | 5 | 6 | 4 | 3 | 5 | 7 | 7 | 8 | 3 | 8 | 9 | 9 |
| Plant 4 |   |   |   | 4 | 6 | 4 | 5 | 3 | 5 | 7 | 7 | 2 | 8 | 8 | 9 |
| Plant 5 |   |   |   |   |   |   | 1 | 1 | 3 | 4 | 3 | 6 | 2 | 2 | 3 |
| Plant 6 |   |   |   |   |   |   | 1 | 2 | 4 | 5 | 4 | 5 | 6 | 4 | 5 |
| Plant 7 |   |   |   |   |   |   | 3 | 4 | 5 | 5 | 7 | 8 | 8 | 8 | 8 |
| Plant 8 |   |   |   |   |   |   | 2 | 3 | 2 | 3 | 4 | 7 | 6 | 5 | 8 |
| Plant 9 |   |   |   |   |   |   | 1 | 2 | 2 | 3 | 3 | 5 | 6 | 8 | 9 |
| Plant 10 |   |   |   |   |   |   |   |   |   | 2 | 7 | 7 | 6 |   |   |
| Plant 11 |   |   |   |   |   |   |   | 9 |   | 8 | 9 | 9 | 9 |   |   |
| Plant 12 |   |   |   |   |   |   |   |   |   |   |   | 4 | 2 |   | 4 |

*FIG. 3*

Categorized Time Based Reliability Data

| EFOR | 1999 | 2000 | 2001 | 2002 | 2003 | 2004 | 2005 | 2006 | 2007 | 2008 | 2009 | 2010 | 2011 | 2012 | 2013 |
|---|---|---|---|---|---|---|---|---|---|---|---|---|---|---|---|
| Plant 1 | 2.4 | 3.0 | 1.9 | 1.7 | 6.4 | 1.5 | 5.5 | 3.7 | 6.6 | 4.2 | 3.9 | 4.7 | 3.9 | 8.6 | 5.9 |
| Plant 2 | 5.5 | 7.0 | 1.8 | 2.5 | 2.4 | 2.0 | 1.7 | 4.1 | 3.4 | 1.4 | 5.8 | 5.3 | 3.9 | 4.9 | 9.9 |
| Plant 3 |  |  |  | 4.6 | 5.5 | 3.8 | 2.7 | 2.5 | 3.5 | 3.1 | 6.9 | 29.8 | 24.3 | 7.6 | 14.1 |
| Plant 4 |  |  |  | 1.8 | 2.4 | 2.6 | 8.1 | 8.8 | 2.5 | 2.3 | 1.6 | 2.7 | 3.6 | 7.3 | 7.7 |
| Plant 5 |  |  |  |  |  |  | 2.9 | 5.7 | 3.9 | 3.4 | 3.5 | 5.1 | 5.8 | 2.9 | 4.3 |
| Plant 6 |  |  |  |  |  |  | 2.7 | 7.5 | 2.8 | 3.4 | 4.2 | 3.8 | 3.6 | 3.6 | 9.2 |
| Plant 7 |  |  |  |  |  |  | 5.2 | 4.7 | 9.0 | 6.3 | 7.7 | 9.3 | 6.2 | 7.3 | 4.9 |
| Plant 8 |  |  |  |  |  |  | 5.9 | 8.5 | 10.6 | 7.0 | 7.0 | 2.4 | 6.2 | 7.5 | 4.1 |
| Plant 9 |  |  |  |  |  |  | 7.2 | 5.3 | 12.0 | 5.6 | 2.6 | 4.9 | 4.9 | 19.6 | 10.3 |
| Plant 10 |  |  |  |  |  |  |  |  |  | 10.7 | 19.3 | 10.4 | 11.5 |  |  |
| Plant 11 |  |  |  |  |  |  |  | 3.7 |  | 4.2 | 3.9 | 4.7 | 3.9 |  |  |
| Plant 12 |  |  |  |  |  |  |  |  |  |  |  |  | 4.9 |  | 0.7 |

FIG. 4

Future 2 Year Reliability Data by Current Ordinal Maintenance Spending Category

| Maintenance Spending Ratio Ordinal Category | | | | | | | | |
|---|---|---|---|---|---|---|---|---|
| 502 | 504 | 506 | 508 | 510 | 512 | 514 | 516 | 518 |
| 1 | 2 | 3 | 4 | 5 | 6 | 7 | 8 | 9 |
| 7.48 | 10.37 | 4.32 | 25.19 | 13.02 | 7.10 | 11.50 | 7.40 | 0.36 |
| 7.94 | 8.88 | 13.71 | 2.75 | 44.58 | 14.88 | 2.23 | 1.29 | 13.36 |
| 8.08 | 8.64 | 2.71 | 1.40 | 15.22 | 10.57 | 12.26 | 16.99 | 7.67 |
| 3.64 | 11.81 | 4.89 | 3.13 | 11.72 | 13.13 | 45.47 | 5.18 | 6.62 |
| 4.19 | 10.37 | 6.62 | 6.30 | 3.19 | 19.08 | 5.07 | 1.39 | 7.68 |
| 3.93 | 6.21 | 3.77 | 11.07 | 1.80 | 15.62 | 2.20 | 4.94 | 5.18 |
| 3.39 | 0.92 | 4.45 | 5.73 | 1.90 | 3.37 | 5.95 | 2.80 | 14.14 |
| 2.76 | 12.02 | 7.30 | 3.39 | 0.46 | 3.34 | 5.08 | 6.33 | 6.28 |
| 12.00 | 3.56 | 4.59 | 6.03 | 3.43 | 2.94 | 3.66 | 9.14 | 1.04 |
| 7.65 | 4.32 | 3.46 | 5.07 | 4.36 | 2.25 | 2.96 | 2.64 | 2.42 |
| 6.41 | 3.43 | 5.77 | 4.18 | 4.31 | 14.93 | 6.25 | 2.88 | 1.92 |
| 3.47 | 10.56 | 9.01 | 3.59 | 3.31 | 7.09 | 7.47 | 6.29 | 0.40 |
| 16.15 | 6.99 | 7.04 | 6.28 | 3.82 | 5.39 | 3.18 | 7.26 | 0.22 |
| 1.46 | 5.58 | 2.41 | 6.21 | 3.59 | 6.49 | 3.59 | 4.94 | 3.93 |
| 5.65 | 2.57 | 4.95 | 3.29 | 7.70 | 1.38 | 0.46 | 7.74 | 0.43 |
| 15.35 | 5.23 | 4.94 | 5.14 | 9.32 | 6.85 | 3.20 | 1.47 | 20.86 |
| 1.95 | 2.91 | 4.45 | 1.03 | 19.63 | 7.54 | 1.20 | 0.51 | 13.66 |
| 8.87 | 1.32 | 3.97 | 3.52 | 11.20 | 3.19 | 2.99 | 2.23 | 2.08 |
| 16.59 | 2.70 | 2.40 | 6.44 | 6.31 | 2.54 | 7.07 | 4.07 | 2.60 |
| 1.94 | 2.48 | 0.66 | 1.49 | 14.71 | 2.95 | 7.96 | 2.83 | 1.60 |
| 1.82 | 2.56 | 6.29 | 4.21 | 2.42 | 9.22 | 3.66 | 3.42 | 9.58 |
| 2.47 | 5.50 | 7.19 | 3.85 | 0.67 | 4.10 | 3.87 | 3.65 | 2.57 |
| 3.38 | 12.11 | 5.21 | 1.72 | 0.88 | 10.34 | 45.19 | 8.78 | 3.17 |
| 5.78 | 4.33 | 2.88 | 7.96 | 1.45 | 0.16 | 15.05 | 4.31 | |
| 8.17 | 1.48 | 2.45 | 21.46 | 2.18 | 4.10 | 37.40 | 8.15 | |
| 2.45 | 8.88 | 8.68 | 6.29 | 2.43 | 1.78 | 2.85 | 28.48 | |
| 8.48 | 1.69 | 16.20 | 5.35 | 1.79 | 2.80 | 2.78 | 6.20 | |
| 5.65 | 3.68 | 6.66 | 1.46 | 2.00 | 3.33 | | 5.63 | |
| 11.45 | 2.42 | 5.79 | 8.89 | 9.93 | 3.90 | | 7.76 | |
| 9.72 | 4.05 | 5.51 | 11.65 | 17.09 | 4.74 | | 21.84 | |
| 1.23 | 1.39 | 6.64 | 5.53 | 6.22 | 5.95 | | 12.69 | |
| 3.37 | 5.83 | 8.63 | 4.77 | 2.61 | 5.04 | | 1.87 | |
| 12.09 | 5.27 | 3.74 | 1.96 | 11.95 | 7.39 | | 5.70 | |
| 9.02 | 4.86 | 2.55 | | 1.13 | 7.53 | | 3.11 | |
| 0.57 | 1.07 | 1.04 | | 6.74 | 2.73 | | 0.91 | |
| 0.01 | 11.81 | 1.78 | | 5.49 | 5.44 | | 2.13 | |
| 6.61 | 5.10 | 4.49 | | 8.25 | 9.12 | | | |
| 9.09 | 47.58 | 3.06 | | 1.91 | 23.08 | | | |
| 2.90 | 6.08 | 13.92 | | 3.65 | 0.88 | | | |
| 2.34 | 2.33 | 7.06 | | 4.69 | 7.85 | | | |
| | 14.75 | 0.41 | | 30.55 | 5.75 | | | |
| | 8.10 | 2.03 | | 7.64 | 2.13 | | | |
| | 2.71 | 4.84 | | | 9.45 | | | |
| | 1.55 | 2.29 | | | | | | |
| | 10.88 | 8.04 | | | | | | |
| | 15.57 | 5.55 | | | | | | |
| | 20.36 | 8.32 | | | | | | |
| | 3.32 | | | | | | | |
| | 0.99 | | | | | | | |

*FIG. 5*

Future 2 Year Reliability Statistics by Current Ordinal Maintenance Spending Category

| | Maintenance Spending Ratio Ordinal Category | | | | | | | | |
|---|---|---|---|---|---|---|---|---|---|
| Statistic | 1 | 2 | 3 | 4 | 5 | 6 | 7 | 8 | 9 |
| Avg | 6.14 | 6.88 | 5.38 | 5.95 | 7.51 | 6.68 | 9.28 | 6.19 | 5.55 |
| Median | 5.65 | 5.10 | 4.89 | 5.07 | 4.34 | 5.44 | 3.87 | 4.94 | 3.17 |
| $P_{90}$ | 12.01 | 12.04 | 8.65 | 10.63 | 15.17 | 14.53 | 23.99 | 10.92 | 13.60 |

FIG. 6

EFOR Prediction Data Input

| | Mx Data Years | |
|---|---|---|
| MunichRE | | ⦿ Cool-Rankine |
| Operations Data | 2014 | |
| Plant Net Dependable Capacity (mw) | 0 | 0 | ⦿ Gas-Rankine |
| Bagger (Y/N) | – | – | |
| Precipitator (Y/N) | – | – | |
| Scrubber (Y/N) | – | – | ⦿ Combustion Turbine |
| Selective Catalytic Recovery (Y/N) | – | – | |
| Fuel % Ash Content | 0.00% | 0.00% | |
| Fuel % Sulphur Content | 0.00% | 0.00% | |
| Fuel Heating Value | 0 | 0 | |
| Annual Mwh | 0 | 0 | |
| # of Annual Starts | 0 | 0 | |
| Plant Age (yr) | 0.0 | 0.0 | |
| Annual NonFuel Mx Spending (k$) | $0 | $0 | |
| Annual Mx Standard (k$) | — | — | |
| Risk Modification Factor | — | — | |

*FIG. 7*

Pipeline and Tankfarm Example

| Facility Number | Type of Fluid | Number of Input and Output Stations | Total Main Pump Driver | Number of Tanks | Total Nominal Tank Capacity | Actual Cash OPEX | Predicted Cash OPEX | Error |
|---|---|---|---|---|---|---|---|---|
| #1 | 1 | 8 | 74.0 | 34 | 1,158 | ???? | ???? | ??? |
| #2 | 2 | 16 | 29.0 | 0 | 0 | ???? | ???? | ??? |
| #3 | 1 | 2 | 5.8 | 7 | 300 | ???? | ???? | ??? |
| #4 | 1 | 5 | 4.9 | 6 | 490 | ???? | ???? | ??? |
| #5 | 1 | 2 | 5.4 | 8 | 320 | ???? | ???? | ??? |
| #6 | 2 | 2 | 2.5 | 33 | 191 | ???? | ???? | ??? |
| #7 | 1 | 3 | 8.2 | 0 | 0 | ???? | ???? | ??? |
| #8 | 2 | 2 | 8.7 | 0 | 0 | ???? | ???? | ??? |
| #9 | 1 | 3 | 15.0 | 10 | 180 | ???? | ???? | ??? |
| #10 | 1 | 9 | 12.0 | 22 | 860 | ???? | ???? | ??? |
| #11 | 1 | 4 | 20.0 | 5 | 208 | ???? | ???? | ??? |
| #12 | 2 | 9 | 9.3 | 0 | 0 | ???? | ???? | ??? |
| #13 | 2 | 12 | 6.2 | 0 | 0 | ???? | ???? | ??? |
| #14 | 1 | 5 | 41.4 | 19 | 430 | ???? | ???? | ??? |
| #15 | 2 | 8 | 8.2 | 0 | 0 | ???? | ???? | ??? |
| #16 | 1 | 8 | 96.8 | 31 | 1,720 | ???? | ???? | ??? |
| #17 | 1 | 2 | 15.0 | 8 | 294 | ???? | ???? | ??? |

Constraints

| | Minimum | 0 | 0 | 0 | 0 | 0 |
| --- | --- | --- | --- | --- | --- | --- |
| | Maximum | 2000 | 700 | 600 | 500 | 100 |

| Equivalency Factor | 1301.1 | 435.4 | 170.8 | 134.0 | 6.11 |
|---|---|---|---|---|---|

Sum ???

FIG. 15

FUTURE RELIABILITY PREDICTION BASED ON SYSTEM OPERATIONAL AND PERFORMANCE DATA MODELLING

CROSS-REFERENCE TO RELATED APPLICATIONS

This application claims the benefit, and priority benefit, of U.S. Provisional Patent Application Ser. No. 61/978,683 filed Apr. 11, 2014, titled "System and Method for the Estimation of Future Reliability Based on Historical Maintenance Spending," the disclosure of which is incorporated herein in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF TECHNOLOGY

The disclosure generally relates to the field of modelling and predicting future reliability of measurable systems based on operational and performance data, such as current and historical data regarding production and/or cost associated with maintaining equipment. More particularly, but not by way of limitation, embodiments within the disclosure perform comparative performance analysis and/or determine model coefficients used to model and estimate future reliability of one or more measurable systems.

BACKGROUND

Typically, for repairable systems, there is a general correlation between the methodology and process used to maintain the repairable systems and future reliability of the systems. For example, individuals who have owned or operated a bicycle, a motor vehicle, and/or any other transportation vehicle are typically aware that the operating condition and reliability of the transportation vehicles can be dependent to some extent on the degree and quality of activities to maintain the transportation vehicles. However, although a correlation may exist between maintenance quality and future reliability, quantifying and/or modelling this relationship may be difficult. In addition to repairable systems, similar relationships and/or correlations may be true for a wide-variety of measurable systems where operation and/or performance data is available or otherwise where data used to evaluate a system may be measured.

Unfortunately, the value or amount of maintenance spending may not necessarily be an accurate indicator for predicting future reliability of the repairable system. Individuals can accrue maintenance costs that are spent on task items that have relatively minimum effect on improving future reliability. For example, excessive maintenance spending may originate from actual system failures rather than performing preventive maintenance related tasks. Generally, system failures, breakdowns, and/or unplanned maintenance can cost more than a preventive and/or predictive maintenance program that utilizes comprehensive maintenance schedules. As such, improvements need to be made that improve the accuracy for modelling and predicting future reliability of a measurable system.

BRIEF SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a system for modelling future reliability of a facility based on operational and performance data, comprising an input interface configured to: receive maintenance expense data corresponding to a facility; receive first principle data corresponding to the facility; and receive asset reliability data corresponding to the facility. The system may also comprise a processor coupled to a non-transitory computer readable medium, wherein the non-transitory computer readable medium comprises instructions when executed by the processor causes the apparatus to: obtain one or more comparative analysis models associated with the facility; obtain a maintenance standard that generates a plurality of category values that categorizes the maintenance expense data by a designated interval based upon at least the maintenance expense data, the first principle data, and the one or more comparative analysis models; and determine an estimated future reliability of the facility based on the asset reliability data and the plurality of category values. The computer node may also comprise a user interface that displays the results of the future reliability.

In another embodiment, a method for modelling future reliability of a measurable system based on operational and performance data, comprising: receiving maintenance expense data via an input interface associated with a measurable system; receiving first principle data via an input interface associated with the measurable system; receiving asset reliability data via an input interface associated with the measurable system; generating, using a processor, a plurality of category values that categorizes the maintenance expense data by a designated interval using a maintenance standard that is generated from one or more comparative analysis models associated with the measurable system; determining, using a processor, an estimated future reliability of the measurable system based on the asset reliability data and the plurality of category values; and outputting the results of the estimated future reliability using an output interface.

In yet another embodiment, an apparatus for modelling future reliability of an equipment asset based on operational and performance data, comprising an input interface comprising a receiving device configured to: receive maintenance expense data corresponding to an equipment asset; receive first principle data corresponding to the equipment asset; receive asset reliability data corresponding to the equipment asset; a processor coupled to a non-transitory computer readable medium, wherein the non-transitory computer readable medium comprises instructions when executed by the processor causes the apparatus to: generate a plurality of category values that categorizes the maintenance expense data by a designated interval from a maintenance standard; and determine an estimated future reliability of the facility comprising estimated future reliability data based on the asset reliability data and the plurality of category values; and an output interface comprising a transmission device configured to transmit a processed data set that comprises the estimated future reliability data to a control center for comparing different equipment assets based on the processed data set.

BRIEF DESCRIPTION OF THE DRAWING

FIG. 2 is a schematic diagram of an embodiment of a data compilation table generated in the data compilation of the data analysis method described in FIG. 1;

FIG. 3 is a schematic diagram of an embodiment of a categorized maintenance table generated in the categorized time based maintenance data of the data analysis method described in FIG. 1;

FIG. 4 is a schematic diagram of an embodiment of a categorized reliability table generated in the categorized time based reliability data of the data analysis method described in FIG. 1;

FIG. 5 is a schematic diagram of an embodiment of a future reliability data table generated in the future reliability prediction of the data analysis method described in FIG. 1;

FIG. 6 is a schematic diagram of an embodiment of a future reliability statistic table generated in the future reliability prediction of the data analysis method described in FIG. 1;

FIG. 7 is a schematic diagram of an embodiment of a user interface input screen configured to display information a user may need to input to determine a future reliability prediction using the data analysis method described in FIG. 1;

FIG. 15 is a schematic diagram of an embodiment of a model coefficient matrix with respect to the pipeline and tank farm for determining model coefficients for use in comparative performance analysis as illustrated in FIGS. 10-12.

Figure 1:
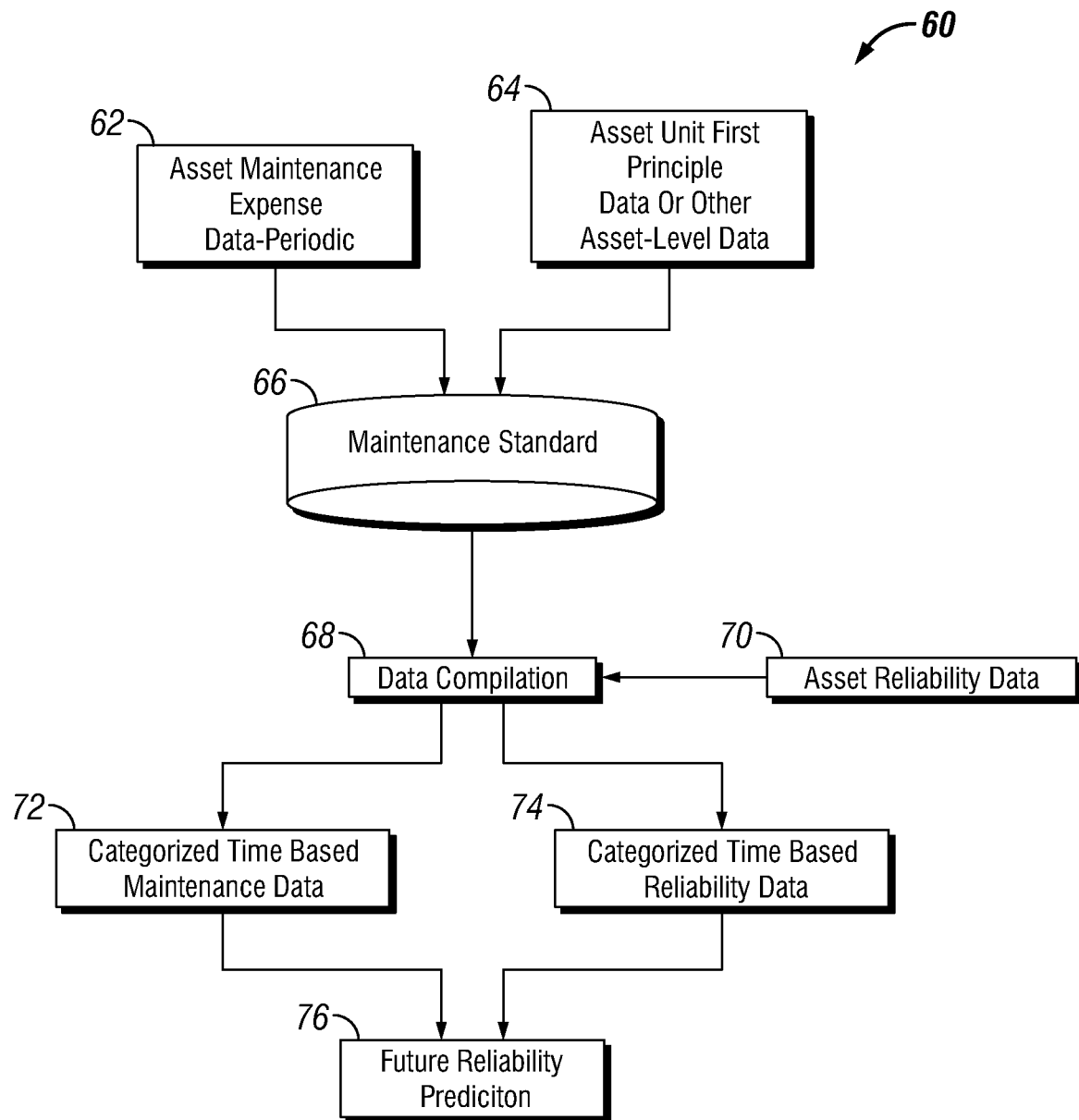
FIG. 1 is a flow chart of an embodiment of a data analysis method that receives data from one or more various data sources relating to a measurable system, such as a power generation plant.

While certain embodiments will be described in connection with the preferred illustrative embodiments shown herein, it will be understood that it is not intended to limit the invention to those embodiments. On the contrary, it is intended to cover all alternatives, modifications, and equivalents, as may be included within the spirit and scope of the invention as defined by claims that are included within this disclosure. In the drawing figures, which are not to scale, the same reference numerals are used throughout the description and in the drawing figures for components and elements having the same structure, and primed reference numerals are used for components and elements having a similar function and construction to those components and elements having the same unprimed reference numerals.

DETAILED DESCRIPTION

It should be understood that, although an illustrative implementation of one or more embodiments are provided below, the various specific embodiments may be implemented using any number of techniques known by persons of ordinary skill in the art. The disclosure should in no way be limited to the illustrative embodiments, drawings, and/or techniques illustrated below, including the exemplary designs and implementations illustrated and described herein. Furthermore, the disclosure may be modified within the scope of the appended claims along with their full scope of equivalents.

Disclosed herein are one or more embodiments for estimating future reliability of measurable systems. In particular, one or more embodiments may obtain model coefficients for use in comparative performance analysis by determining one or more target variables and one or more characteristics for each of the target variables. The target variables may represent different parameters for a measurable system. The characteristics of a target variable may be collected and sorted according to a data collection classification. The data collection classification may be used to quantitatively measure the differences in characteristics. After collecting and validating the data, a comparative analysis model may be developed to compare predicted target variables to actual target variables for one or more measurable systems. The comparative analysis model may be used to obtain a set of complexity factors that attempts to minimize the differences in predicted versus actual target variable values within the model. The comparative analysis model may then be used to develop a representative value for activities performed periodically on the measurable system to predict future reliability.

FIG. 1 is a flow chart of an embodiment of a data analysis method 60 that receives data from one or more various data sources relating to a measurable system, such as a power generation plant. The data analysis method 60 may be implemented by a user, a computing node, or combinations thereof to estimate future reliability of a measurable system. In one embodiment, the data analysis method 60 may automatically receive updated available data, such as updated operational and performance data, from various data sources, update one or more comparative analysis models using the received updated data, and subsequently provide updates on estimations of future reliability for one or more measurable system. A measurable system is any system that is associated with performance data, conditioned data, operation data, and/or other types of measurable data (e.g., quantitative and/or qualitative data) used to evaluate the status of the system. For example, the measurable system may be monitored using a variety parameters and/or performance factors associated with one or more components of the measurable system, such as in a power plant, facility, or commercial building. In another embodiment, the measurable system may be associated with available performance data, such as stock prices, safety records, and/or company finance. The terms "measurable system," "facility," "asset," or "plant," may be used interchangeably throughout this disclosure.

As shown in FIG. 1, the data from the various data sources may be applied at different computational stages to model and/or improve future reliability predictions based on available data for a measurable system. In one embodiment, the available data may be current and historic maintenance data that relates to one or more measurable parameters of the measurable system. For instance, in terms of maintenance and repairable equipment, one way to describe maintenance quality is to compute the annual or periodic maintenance cost for a measurable system, such as an equipment asset. The annual or periodic maintenance number denotes the amount of money spent over a given period of time, which may not necessarily accurately reflect future reliability. For example, a vehicle owner may spend money to wash and clean a vehicle weekly, but spend relatively little or no money for maintenance that could potentially increase the future reliability of car, such as replacing tires and/or oil or filter changes. Although the annual maintenance costs for washing and cleaning the car may be a sizeable number when performed frequently, the maintenance task and/or activities of washing and cleaning may have relatively little or no effect on improving a car's reliability.

FIG. 1 illustrates that the data analysis method 60 may be used to predict the future Equivalent Forced Outage Rate (EFOR) estimates for Rankine and Brayton cycle based power generation plants. EFOR is defined as the hours of unit failure (e.g., unplanned outage hours and equivalent unplanned derated hours) given as a percentage of the total hours of the availability of that unit (e.g., unplanned outage, unplanned derated, and service hours). As shown in FIG. 1, within a first data collection stage, the data analysis method 60 may initially obtain asset maintenance expense data 62 and asset unit first principle data or other asset-level data 64 that relate to the measurable data system, such as a power generation plant. Asset maintenance expense data 62 for a variety of facilities may typically be obtained directly from the plant facilities. The asset maintenance expense data 62 may represent the cost associated with maintaining a measurable system for a specified time period (e.g. in seconds, minutes, hours, months, and years). For example, the asset maintenance expense data 62 may be the annual or periodic maintenance cost for one or more measurable systems. The asset unit first principle data or other asset-level data 64 may represent physical or fundamental characteristics of a measurable system. For example, the asset unit first principle data or other asset-level data 64 may be operational and performance data, such as turbine inlet temperature, age of the asset, size, horsepower, amount of fuel consumed, and actual power output compared to nameplate that correspond to one more measurable systems.

The data obtained in the first data collection stage may be subsequently received or entered to generate a maintenance standard 66. In one embodiment, the maintenance standard 66 may be an annualized maintenance standard where a user supplies in advance one or more modelling equations that compute the annualized maintenance standard. The result may be used to normalize the asset maintenance expense data 62 and provide a benchmark indicator to measure the adequacy of spending relative to other power generation plants of a similar type. In one embodiment, a divisor or standard can be computed based on the asset unit's first principle data or other asset-level data 104, which are explained in more detail in FIGS. 10-12. Alternative embodiments may produce the maintenance standard 66, for example, from simple regression analysis with data from available plant related target variables.

Maintenance expenses for the replacement of components that normally wear out over time may occur at different time intervals causing variations in periodic maintenance expenses. To address the potential issue, the data analysis method 60 may generate a maintenance standard 66 that develops a representative value for maintenance activities on a periodic basis. For example, to generate the maintenance standard 66, the data analysis method 60 may normalize maintenance expenses to some other time period. In another embodiment, the data analysis method 60 may generate a periodic maintenance spending divisor to normalize the actual periodic maintenance spending to measure the under (Actual Expense/Divisor ratio <1) or over (Actual Expense/Divisor ratio >1) spending. The maintenance spending divisor may be a value computed from a semi-empirical analysis of data using asset maintenance expense data 62, asset unit first principle data or other asset-level data 64 (e.g., asset characteristics), and/or documented expert opinions. In this embodiment, an asset unit first principle data or other asset-level data 64, such as plant size, plant type, and/or plant output, in conjunction with computed annualized maintenance expenses may be used to compute a standard maintenance expense (divisor) value for each asset in the analysis as described in U.S. Pat. No. 7,233,910, filed Jul. 18, 2006, titled "System and Method for Determining Equivalency Factors for use in Comparative Performance Analysis of Industrial Facilities," which is hereby incorporated by reference as if reproduced in their entirety. The calculation may be performed with a historical dataset that may include the assets under current analysis. The maintenance standard calculation may be applied as a model that includes one or more equations for modelling a measurable system's future reliability prediction. The data used to compute the maintenance standard divisor may be supplied by the user, transferred from a remote storage device, and/or received via a network from a remote network node, such as a server or database.

FIG. 1 illustrates that the data analysis method 60 may receive the asset reliability data 400 in a second data collection stage. The asset reliability data 70 may correspond to each of the measurable systems. The asset reliability data 70 is any data that corresponds to determining the reliability, failure rate and/or unexpected down time of a measurable system. Once the data analysis method 60 receives the asset reliability data 70 for each measurable system, the data analysis method 60 may be compiled and linked to the measurable systems' maintenance spending ratio, which may be associated or shown on the same line as the other measurable systems and time specific data. For power generation plants, the asset reliability data 70 may be obtained from the National American Electric Reliability Corporation's Generating Availability Database (NERC-GADS). Other types of measurable systems may also obtain asset reliability data 70 from similar databases.

At data compilation 68, the data analysis method 60 compiles the computed maintenance standard 66, asset maintenance expense data 62, and asset reliability data 70 into a common file. In one embodiment, the data analysis method 60 may add an additional column to the data arrangement within the common file. The additional column may represent the ratios of actual annualized maintenance expenses and the computed standard value for each measurable system. The data analysis method 60 may also add another column within the data compilation 68 that categorizes the maintenance spending ratios divided by some percentile intervals or categories. For example, the data analysis method 60 may use nine different intervals or categories to categorize the maintenance spending ratios.

In the categorized time based maintenance data 72, the data analysis method 60 may place the maintenance category values into a matrix, such as a 2×2 matrix, that defines each measurable system, such as a power generation plant and time unit. In the categorized time based reliability data 74, the data analysis method 60 assigns the reliability for each measurable system using the same matrix structure as described in the categorized time based maintenance data 72. In the future reliability prediction 76, the data is statistically analyzed from the categorized time based maintenance data 72 and the categorized time based reliability data 74 to compute an average and/or other statistical calculations to determine the future reliability of the measurable system. The number of computed time periods or years in the future may be a function of the available data, such as the asset maintenance expense data 62, asset reliability data 70, and asset unit first principle data or other asset-level data. For instance, the future interval may be one year in advance because of the available data, but other embodiments may utilize selection of two or three years in the future depending on the available data sets. Also, other embodiments may use other time periods besides years, such as seconds, minutes, hours, days, and/or months, depending on the granularity of the available data.

It should be noted that while the discussion involving FIG. 1 was specific to power generation plants and industry, the data analysis method 60 may be also applied to other industries where similar maintenance and reliability databases exist. For example, in the refining and petrochemical industries, maintenance and reliability data exists for process plants and/or other measurable systems over many years. Thus, the data analysis method 60 may also forecast future reliability for process plants and/or other measurable systems using current and previous year maintenance spending ratio values. Other embodiments of the data analysis method 60 may also be applied to the pipeline industry and maintenance of buildings (e.g., office buildings) and other structures.

Persons of ordinary skill in the art are aware that other industries reliability may utilize a wide variety of metrics or parameters for the asset reliability data 70 that differ from the power industry's EFOR measure that was applied in FIG. 1. For example, other appropriate asset reliability data 70 that could be used in the data analysis method 60 include but are not limited to "unavailability," "availability," "commercial unavailability," and "mean time between failures." These metrics or parameters may have definitions often unique to a given situation, but their general interpretation is known to one skilled in the reliability analysis and reliability prediction field.

FIG. 2 is a schematic diagram of an embodiment of a data compilation table 250 generated in the data compilation 68 of the data analysis method 60 described in FIG. 1. The data compilation table 250 may be displayed or transmitted using an output interface, such a graphic user interface or to a printing device. FIG. 2 illustrates that the data compilation table 250 comprises a client number column 252 that indicates the asset owner, a plant name column 254 that indicates the measurable system and/or where the data is being collected, and a study year column 256. As shown in FIG. 2, each asset owner within table 200 owns a single measurable system. In other words, each of the measurable systems is owned by different asset owners. Other embodiments of the data compilation table 250 may have a plurality of measurable systems owned by the same asset owner. The study year column 256 refers to the time period of when the data is collected or analyzed from the measurable system.

The data compilation table 250 may comprise additional columns calculated using the data analysis method 60. The computed maintenance (Mx) standard column 258 may comprise data values that represent the computational result of the maintenance standard as described in maintenance standard 66 in FIG. 1. Recall that in one embodiment, the maintenance standard 66 may be generated as described in as described in U.S. Pat. No. 7,233,910. Other embodiments may compute results of the maintenance standard known by persons of ordinary skill in the art. The actual annualized Mx expense column 260 may comprise computed data values that represent the normalized actual maintenance data based on the maintenance standard as described in maintenance standard 66 in FIG. 1. The actual maintenance data may be the effective annual expense over several years (e.g., about 5 years). The ratio actual (Act) Mx/standard (Std) Mx column 262 may comprise data values that represent the normalized maintenance spending ratio that is used to assess the adequacy or effectiveness of maintenance spending in relationship to future reliability. The last column, the EFOR column 266 comprises data values that represent the reliability or, in this case, un-reliability value for the current time period. The data values of the EFOR column 266 is a summation of hours of unplanned outages and de-rates divided by the hours in the operating period. The definition of EFOR in this example follows the notation as documented in NERC-GADS literature. For example, an EFOR value of 9.7 signifies that the measurable system was effectively down about 9.7% of its operating period due to unplanned outage events.

The Act Mx/Std Mx: Decile column 264 may comprises data values that represent the maintenance spending ratios categorized into value intervals relating to distinct ranges as discussed in data compilation 68 in FIG. 1. Duo-deciles, deciles, sextiles, quintiles, or quartiles could be used, but in this example the data is divided into nine categories based on the percentile ranking of the maintenance spending ratio data values found in the Act Mx/Std mx column 262. The number of intervals or categories used to divide the maintenance spending ratios may depend on the dataset size, where more detailed divisions that are statistically possible may be generated with a relatively larger dataset size. A variety of methods or algorithms known by persons of ordinary skill in the art may be used to determine the number of intervals based on the dataset size. The transformation of maintenance spending ratios into ordinal categories may serve as a reference to assign future EFOR reliability values that were actually achieved.

FIG. 3 is a schematic diagram of an embodiment of a categorized maintenance table 350 generated in the categorized time based maintenance data 72 of the data analysis method 60 described in FIG. 1. The categorized maintenance table 350 may be displayed or transmitted using an output interface, such a graphic user interface or to a printing device. Specifically, the categorized maintenance table 350 is a transformation of the maintenance spending ratio ordinal category data values found within FIG. 2's data compilation table 250. FIG. 3 illustrates that the plant name column 352 may identify the different measurable systems. The year columns 354-382 represent the different years or time periods for each of the measurable systems. Using FIG. 3 as an example, Plants 1 and 2 have data values from 1999-2013 and Plants 3 and 4 have data values from 2002-2013. The type of data found within the year columns 354-382 are substantially similar to the type of data within the Act Mx/Std Mx: Decile column 264 in FIG. 2. In particular, the type of data within the year columns 354-382 represent intervals relating to distinct ranges of the maintenance spending ratio and may be generally referred to as the maintenance spending ratio ordinal category. For example, for the year 1999, Plant 1 has a maintenance spending ratio categorized as "5" and Plant 2 has a maintenance spending ratio categorized as "1."

FIG. 4 is a schematic diagram of an embodiment of a categorized reliability table 400 generated in the categorized time based reliability data 74 of the data analysis method 60 described in FIG. 1. The categorized reliability table 400 may be displayed or transmitted using an output interface, such a graphic user interface or to a printing device. The categorized reliability table 400 is a transformation of EFOR data values found within FIG. 2's data compilation table 250. FIG. 4 illustrates that the plant name column 452 may identify the different measurable systems. The year columns 404-432 represent the different years for each of the measurable systems. Using FIG. 4 as an example, Plants 1 and 2 have data values from 1999-2013 and Plants 3 and 4 have data values from 2002-2013. The type of data found within the year columns 354-382 are substantially similar to the type of data within the EFOR column 266 in FIG. 2. In particular, the type of data within the year columns 354-382 represents EFOR values that denote the percentage of unplanned outage events. For example, for the year 1999, Plant 1 has an EFOR 2.4, which indicates that Plant 1 was down about 2.4% of its operating period due to unplanned outage events and Plant 2 has an EFOR of 5.5, which indicates that Plant 1 was down about 5.5% of its operating period due to unplanned outage events.

FIG. 5 is a schematic diagram of an embodiment of a future reliability data table 500 generated in the future reliability prediction 76 of the data analysis method 60 described in FIG. 1. The future reliability data table 500 may be displayed or transmitted using an output interface, such a graphic user interface or to a printing device. The process of computing future reliability starts with selecting the future reliability interval, for example, in FIG. 5, the interval is about two years. After selecting the future reliability interval, the data shown in FIG. 3 is scanned horizontally or a row by row basis within the categorized maintenance table 350 where entries for a selected row in the categorized maintenance table 350 to determiner rows that are separated out only by about one year. Using FIG. 3 for example, the row associated with Plant 1 would satisfy the data separation of about one year, but Plant 11 would not because Plant 11 in the categorized maintenance table 350 has a data gap between years 2006 and 2008. In other words, Plant 11 is missing data at year 2007, and thus, entries for the Plant 11 are not separated out about one year. Other embodiments may select future reliability interval with different time intervals measured in seconds, minutes, hours, days, and/or months in the future. The time interval used to determine future reliability depends on the level of data granularity.

The maintenance spending ratio ordinal category for each separated row can be subsequently paired up with a time forward EFOR value from the categorized reliability data table 400 to form ordered pairs. The generated order pairs comprise the maintenance spending ratio ordinal category and the time forward EFOR value. Since the selected future reliability interval is about two years, the year associated with the maintenance spending ratio ordinal category and the year for the EFOR value within the generated order pairs may be two years apart. Some examples of these ordered pairs for the same plant or same row for analyzing future about two years in advance are:

First order pair: (maintenance spending ratio ordinal category in 1999, EFOR value 2001)

Second order pair: (maintenance spending ratio ordinal category in 2000, EFOR value 2002)

Third order pair: (maintenance spending ratio ordinal category in 2001, EFOR value 2003)

Fourth order pair: (maintenance spending ratio ordinal category in 2002, EFOR value 2004)

As shown above, in each of the order pairs, the years that separate the maintenance spending ratio ordinal category and the EFOR value are based on the future reliability interval, which is about two years. To form the order pairs, the matrices of FIGS. 3 and 4 may be scanned for possible data pairs separated by two years (e.g., 1999 and 2001). In this case, the middle year data is not used (e.g., 2000) for the data pairs. This process can repeated for other future reliability intervals (e.g., one year in advance of the maintenance ratio ordinal value at the discretion of the user and the information desired from the analysis). Moreover, the order pair examples above depict that the maintenance spending ratio ordinal category and EFOR values are incremented by one for each of the order pairs. For example, the first order pair has a maintenance spending ratio ordinal category in 1999 and the second order pair has a maintenance spending ratio ordinal category in 2000.

The different maintenance spending ratio ordinal category value is used to place the corresponding time forward EFOR value into the correct column within the future reliability data table 500. As shown in FIG. 5, column 502 comprises EFOR values with a maintenance spending ratio ordinal category of "1"; column 504 comprises EFOR values with a maintenance spending ratio ordinal category of "2"; column 506 comprises EFOR values with a maintenance spending ratio ordinal category of "3"; column 508 comprises EFOR values with a maintenance spending ratio ordinal category of "4"; column 510 comprises EFOR values with a maintenance spending ratio ordinal category of "5"; column 512 comprises EFOR values with a maintenance spending ratio ordinal category of "6"; column 514 comprises EFOR values with a maintenance spending ratio ordinal category of "7"; column 516 comprises EFOR values with a maintenance spending ratio ordinal category of "8"; and column 518 comprises EFOR values with a maintenance spending ratio ordinal category of "9."

FIG. 6 is a schematic diagram of an embodiment of a future reliability statistic table 600 generated in the future reliability prediction 76 of the data analysis method 60 described in FIG. 1. The future reliability statistic table 600 may be displayed or transmitted using an output interface, such a graphic user interface or to a printing device. In FIG. 6, the future reliability statistic table 600 comprises the maintenance spending ratio ordinal category columns 602-618. As shown in FIG. 6, each of the maintenance spending ratio ordinal category columns 602-618 corresponds to a maintenance spending ratio ordinal category. For example, maintenance spending ratio ordinal category column 602 corresponds to the maintenance spending ratio ordinal category "1" and maintenance spending ratio ordinal category column 604 corresponds to the maintenance spending ratio ordinal category "2." The compiled data in each maintenance ratio ordinal value column 602-618 is analyzed using the data within the future reliability data table 500 to compute various statistics that indicate future reliability information. As shown in FIG. 6, rows 620, 622, and 624 represent the average, median, and the value at the $90^{th}$ percentile distribution for the future reliability data for each of the maintenance ratio ordinal values. In FIG. 6, the future reliability information is interpreted as the future reliability predictions or EFOR for a measurable system that the current year has a specific maintenance spending ratio ordinal values.

Future EFOR predictions can be computed utilizing current and previous years' maintenance spending ratios. For multi-year cases, the maintenance spending ratios are computed by adding the annualized expenses for the years, and dividing by the sum of the maintenance standards for the previous years. This way the spending ratio reflects performance over several years relative to a general standard that is the summation of the standards computed for each of the included years.

FIG. 7 is a schematic diagram of an embodiment of a user interface input screen 700 configured to display information a user may need to input to determine a future reliability prediction 76 using the data analysis method 60 described in FIG. 1. The user interface input screen 700 comprises a measurable system selection column 702 that a user may use to select the type of measurable system. Using FIG. 7 as an example, the user may select the "Coal-Rankine" plant as the type of power generation unit or measurable system. Other selections shown in FIG. 7 include "Gas-Rankine" and "Combustion Turbine." Once the type of measurable system is selected, the user interface input screen 700 may generate the required data items 704 associated with the type of measurable system a user selects. The data items 704 that appear within the user interface input screen 700 may vary depending on the selected measurable system within the measurable system selection column 702. FIG. 7 illustrates that a user has selected a Coal-Rankine plant and the user may enter all fields that are shown blank with an underscore line. This may also include the annualized maintenance expenses for the specific year. In other embodiments, the blank fields may be entered using information received from a remote data storage or via a network. The current model also allows a user, if desired, to enter previous year data to add more information for the future reliability prediction. Other embodiments may import and obtain the additional information from a storage medium or via network.

Once this information is entered, the calculation fields 706, such as annual maintenance standard (k$) field and risk modification factor field, at the bottom of user interface input screen 700 may automatically populate based on the information entered by the user. The annual maintenance standard (k$) field may be computed substantially similar to the computed MX standard 258 shown in FIG. 6. The risk modification factor field may represent the overall risk modification factor for the comparative analysis model and may be a ratio of the computed future one year average EFOR to the overall average EFOR. In other words, the data result automatically generated within the risk modification factor field represents the relative reliability risk of a particular measurable system compared to an overall average.

Figure 8:
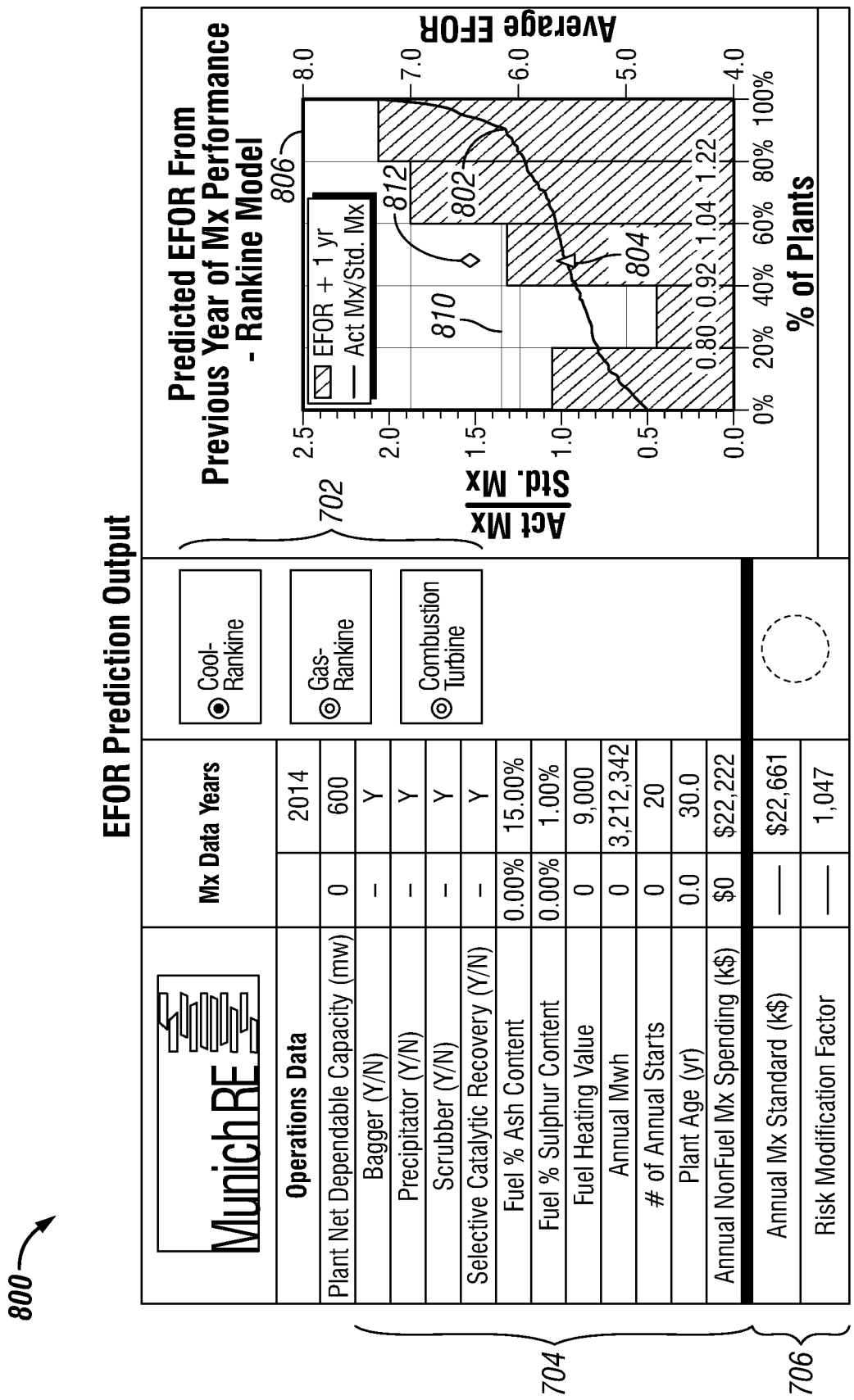
FIG. 8 is a schematic diagram of an embodiment of a user interface input screen configured for EFOR prediction using the data analysis method described in FIG. 1.

FIG. 8 is a schematic diagram of an embodiment of a user interface input screen 800 configured for EFOR prediction using the data analysis method 60 described in FIG. 1. In FIG. 8, there are several results for consideration by the user. The curve 802 is as a ranking curve that represents the distribution of maintenance spending ratios, and the triangle 804 on the curve 802 shows the location of the current measurable system or measurable system under consideration by a user (e.g., the "Coal-Rankine" plant selected in FIG. 7). The user interface input screen 800 illustrates to a user both the range of known performance and where in the range the specific measurable system under consideration falls. The numbers below this curve are the quintile values of the maintenance spending ratio, where the maintenance spending ratios are categorized into five different value intervals. The data results illustrated in FIG. 8 were computed for quintiles in this embodiment; however, other divisions are possible based on the amount of data available and the objectives of the analyst and user.

The histogram 806 represents the average 1 year future EFOR dependent on the specific quintile the maintenance spending ratio falls under. For example, the lowest 1 year future EFOR appears for plants that have a maintenance spending ratio in the second quintile or have maintenance spending ratios of about 0.8 and about 0.92. This level of spending suggests the unit is successfully managing the asset with the better practices that assures long term reliability. Notice that the first quintile or plants with maintenance spending ratios of about zero to about 0.8 actually exhibits a higher EFOR value suggesting that operators are not performing the required or sufficient maintenance to produce long-term reliability. If a plant falls into the fifth quintile, one interpretation of this is that operators could be overspending because of breakdowns. Since maintenance costs from unplanned maintenance events can be larger than planned maintenance expenses, a high maintenance spending ratios may produce high EFOR values.

The dotted line 810 represents the average EFOR for all of the data analyzed for the current measurable system. The diamond 812 represents the actual 1 year future EFOR estimate located directed above the triangle 804, which represents the maintenance spending ratio. The two symbols correlate or connect the current maintenance spending levels, triangle 804, to a future 1 year estimate of EFOR, the diamond 812.

Figure 10:
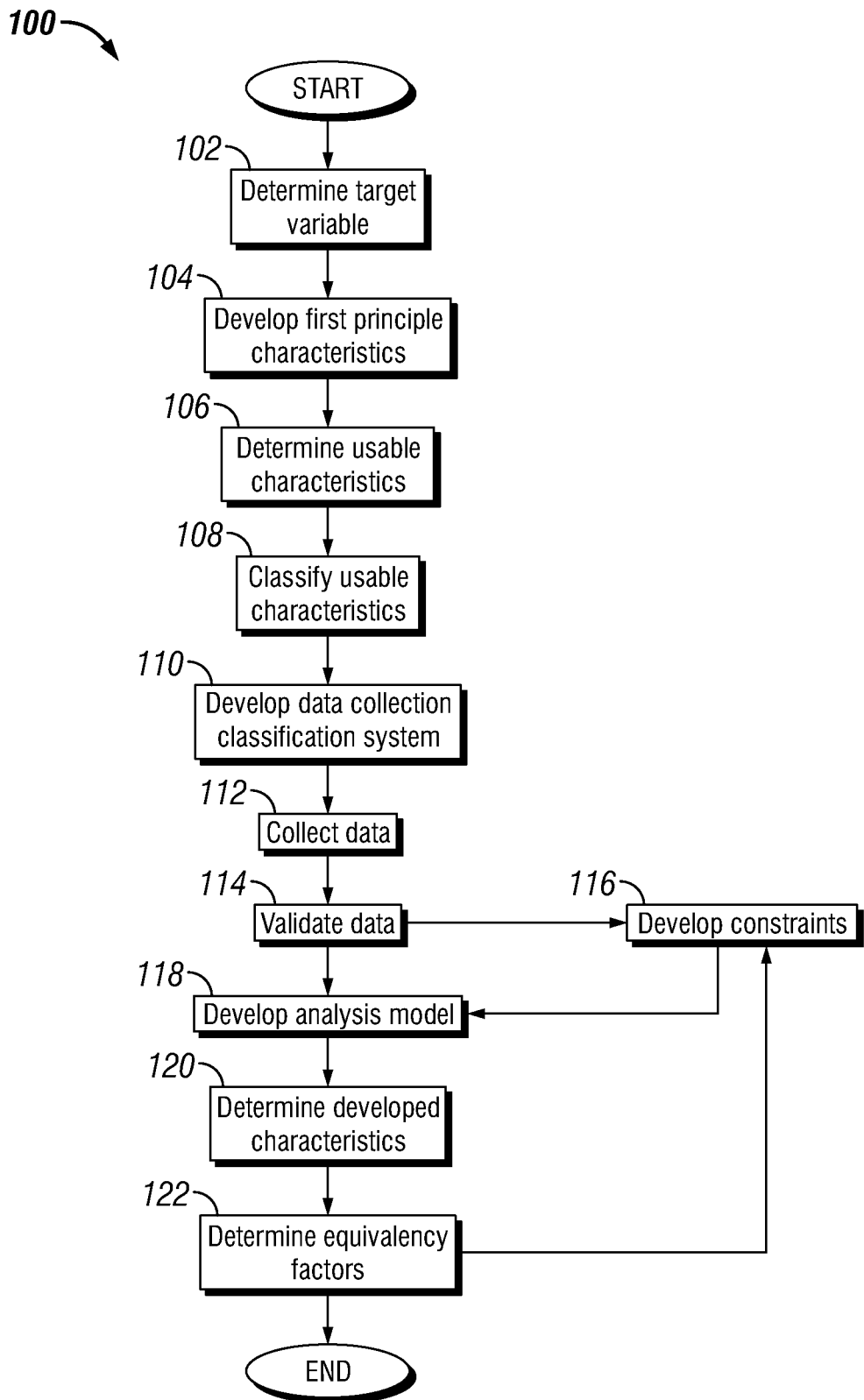
FIG. 10 is a flow chart of an embodiment of a method for determining model coefficients for use in comparative performance analysis of a measurable system, such as a power generation plant.

FIG. 10 is a flow chart of an embodiment of a method 100 for determining model coefficients for use in comparative performance analysis of a measurable system, such as a power generation plant. Method 100 may be used to generate the one or more comparative analysis models used within the maintenance standard 66 described in FIG. 1. Specifically, method 100 determines the usable characteristics and model coefficients associated with one or more comparative analysis models that illustrate the correlation between the maintenance quality and future reliability. Method 100 may be implemented using a user and/or computing node configured to receive inputted data for determining model coefficients. For example, a computing node may automatically receive data and update model coefficients based on received updated data.

Method 100 starts at step 102 and selects one or more target variables ("Target Variables"). The target variable is a quantifiable attribute associated with the measurable system, such as total operating expense, financial result, capital cost, operating cost, staffing, product yield, emissions, energy consumption, or any other quantifiable attribute of performance. Target Variables could be in manufacturing, refining, chemical, including petrochemicals, organic and inorganic chemicals, plastics, agricultural chemicals, and pharmaceuticals, Olefins plant, chemical manufacturing, pipeline, power generating, distribution, and other industrial facilities. Other embodiments of the Target Variables could also be for different environmental aspects, maintenance of buildings and other structures, and other forms and types of industrial and commercial industries.

At step 104, method 100 identifies the first principle characteristics. First principle characteristics are the physical or fundamental characteristics of a measurable system or process that are expected to determine the Target Variable. In one embodiment, the first principle characteristics may be the asset unit first principle data or other asset-level data 64 described in FIG. 1. Common brainstorming or team knowledge management techniques can be used to develop the first list of possible characteristics for the Target Variable. In one embodiment, all of the characteristics of an industrial facility that may cause variation in the Target Variable when comparing different measurable systems, such as industrial facilities, are identified as first principle characteristics.

Figure 11:
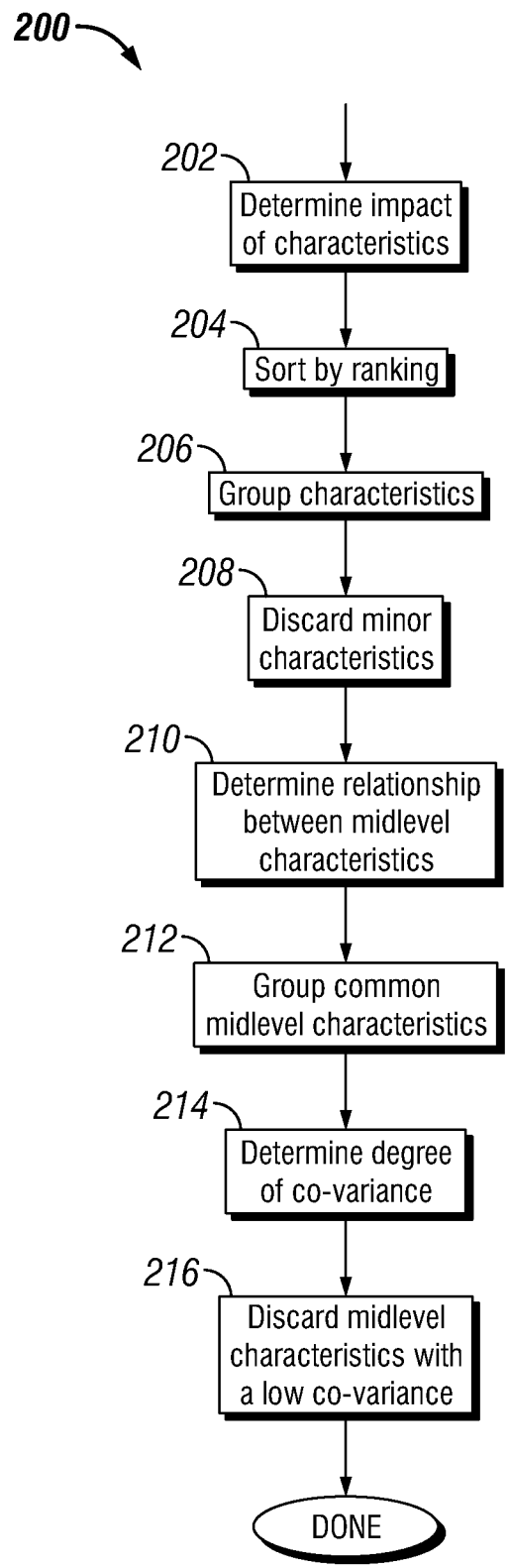
FIG. 11 is a flow chart of an embodiment of a method for determining primary first principle characteristics as described in FIG. 10.

At step 106, method 100 determines the primary first principle characteristics from all of the first principle characterizes identified at step 104. As will be understood by those skilled in the art, many different options are available to determine the primary first principle characteristics. One such option is shown in FIG. 11, which will be discussed in more detail below. Afterwards, method 100 moves to step 108, to classify the primary characteristics. Potential classifications for the primary characteristics include discrete, continuous, or ordinal. Discrete characteristics are those characteristics that can be measured using a selection between two or more states, for example a binary determination, such as "yes" or "no." An example discrete characteristic could be "Duplicate Equipment." The determination of "Duplicate Equipment" is "yes, the facility has duplicate equipment" or "no, there is no duplicate equipment." Continuous characteristics are directly measurable. An example of a continuous characteristic could be the "Feed Capacity," since it is directly measured as a continuous variable. Ordinal characteristics are characteristics that are not readily measurable. Instead, ordinal characteristics can be scored along an ordinal scale reflecting physical differences that are not directly measurable. It is also possible to create ordinal characteristics for variables that are measurable or binary. An example of an ordinal characteristic would be refinery configuration between three typical major industry options. These are presented in ordinal scale by unit complexity:

1.0 Atmospheric Distillation
2.0 Catalytic Cracking Unit
3.0 Coking Unit

The above measurable systems are ranked in order based on ordinal variables and generally do not contain information about any quantifiable quality of measurement. In the above example, the difference between the complexity of the 1.0 measurable system or atmospheric distillation and the 2.0 measurable system or catalytic cracking unit, does not necessarily equal the complexity difference between the 3.0 measurable system or coking unit and the 2.0 measurable system or catalytic cracking unit.

Variables placed in an ordinal scale may be converted to an interval scale for development of model coefficients. The conversion of ordinal variables to interval variables may use a scale developed to illustrate the differences between units are on a measurable scale. The process to develop an interval scale for ordinal characteristic data can rely on the understanding of a team of experts of the characteristic's scientific drivers. The team of experts can first determine, based on their understanding of the process being measured and scientific principle, the type of relationship between different physical characteristics and the Target Variable. The relationship may be linear, logarithmic, a power function, a quadratic function or any other mathematical relationship. Then the experts can optionally estimate a complexity factor to reflect the relationship between characteristics and variation in Target Variable. Complexity factors may be the exponential power used to make the relationship linear between the ordinal variable to the Target Variable resulting in an interval variable scale. Additionally, in circumstances where no data exist, the determination of primary characteristics may be based on expert experience.

At step 110, method 100 may develop a data collection classification arrangement. The method 100 may quantify the characteristics categorized as continuous such that data is collected in a consistent manner. For characteristics categorized as binary, a simple yes/no questionnaire may be used to collect data. A system of definitions may need to be developed to collect data in a consistent manner. For characteristics categorized as ordinal, a measurement scale can be developed as described above.

To develop a measurement scale for ordinal characteristics, method 100 may employ at least four methods to develop a consensus function. In one embodiment, an expert or team of experts can be used to determine the type of relationship that exists between the characteristics and the variation in Target Variable. In another embodiment, the ordinal characteristics can be scaled (for example 1, 2, 3 . . . n for n configurations). By plotting the target value versus the configuration, the configurations are placed in progressive order of influence. In utilizing the arbitrary scaling method, the determination of the Target Variable value relationship to the ordinal characteristic is forced into the optimization analysis, as described in more detail below. In this case, the general optimization model described in Equation 1.0 can be modified to accommodate a potential non-linear relationship. In another embodiment, the ordinal measurement can be scaled as discussed above, and then regressed against the data to make a plot of Target Variable versus the ordinal characteristic to be as nearly linear as possible. In a further embodiment, a combination of the foregoing embodiments can be utilized to make use of the available expert experience, and available data quality and data quantity of data.

Once method 100 establishes a relationship, method 100 may develop a measurement scale at step 110. For instance, a single characteristic may take the form of five different physical configurations. The characteristics with the physical characteristics resulting in the lowest effect on variation in Target Variable may be given a scale setting score. This value may be assigned to any non-zero value. In this example, the value assigned is 1.0. The characteristics with the second largest influence on variation in Target Variable will be a function of the scale setting value, as determined by a consensus function. The consensus function is arrived at by using the measurement scale for ordinal characteristics as described above. This is repeated until a scale for the applicable physical configurations is developed.

At step 112, method 100 uses the classification system developed at step 110 to collect data. The data collection process can begin with the development of data input forms and instructions. In many cases, data collection training seminars are conducted to assist in data collection. Training seminars may improve the consistency and accuracy of data submissions. A consideration in data collection may involve the definition of the measurable system's, such as an industrial facility, analyzed boundaries. Data input instructions may provide definitions of what measurable systems' costs and staffing are to be included in data collection. The data collection input forms may provide worksheets for many of the reporting categories to aid in the preparation of data for entry. The data that is collected can originate from several sources, including existing historical data, newly gathered historical data from existing facilities and processes, simulation data from model(s), or synthesized experiential data derived from experts in the field.

At step 114, method 100 may validate the data. Many data checks can be programmed at step 114 of method 100 such that method 100 may accept data that passes the validation check or the check is over-ridden with appropriate authority. Validation routines may be developed to validate the data as it is collected. The validation routines can take many forms, including: (1) range of acceptable data is specified ratio of one data point to another is specified; (2) where applicable data is cross checked against all other similar data submitted to determine outlier data points for further investigation; and (3) data is cross referenced to any previous data submission judgment of experts. After all input data validation is satisfied, the data is examined relative to all the data collected in a broad "cross-study" validation. This "cross-study" validation may highlight further areas requiring examination and may result in changes to input data.

Figure 12:
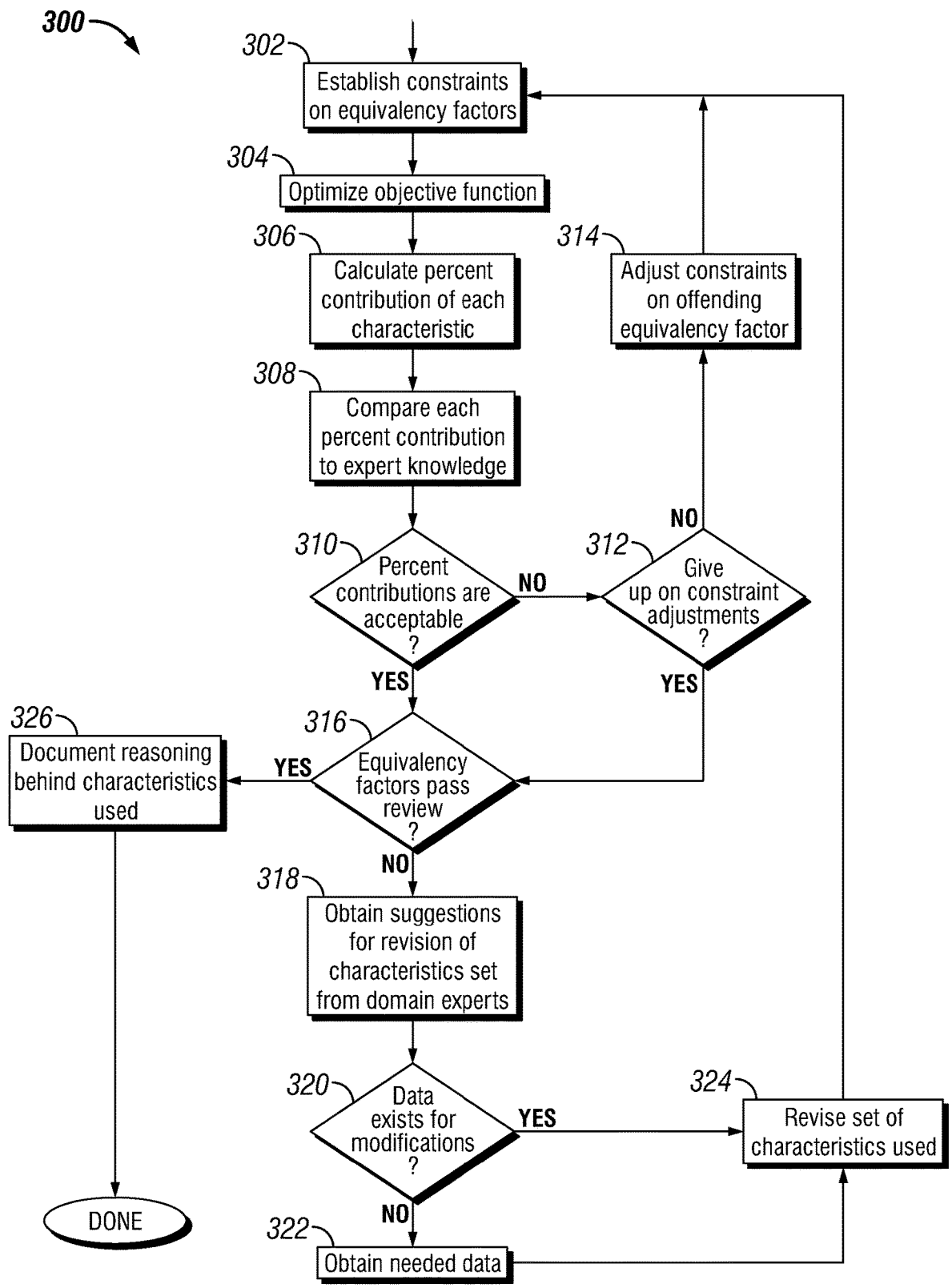
FIG. 12 is a flow chart of an embodiment of a method for developing constraints for use in solving the comparative analysis model as described in FIG. 10.

At step 116, method 100 may develop constraints for use in solving the comparative analysis model. These constraints could include constraints on the model coefficient values. These can be minimum or maximum values, or constraints on groupings of values, or any other mathematical constraint forms. One method of determining the constraints is shown in FIG. 12, which is discussed in more detail below. Afterwards, at step 118, method 100 solves the comparative analysis model by applying optimization methods of choice, such as linear regression, with the collected data to determine the optimum set of factors relating the Target Variable to the characteristics. In one embodiment, the generalized reduced gradient non-linear optimization method can be used. However, method 100 may utilize many other optimization methods.

At step 120, method 100 may determine the developed characteristics. Developed characteristics are the result of any mathematical relationship that exists between one or more first principle characteristics and may be used to express the information represented by that mathematical relationship. In addition, if a linear general optimization model is utilized, then nonlinear information in the characteristics can be captured in developed characteristics. Determination of the developed characteristics form is accomplished by discussion with experts, modelling expertise, and by trial and refinement. At step 122, method 100 applies the optimization model to the primary first principle characteristics and the developed characteristics to determine the model coefficients. In one embodiment, if developed characteristics are utilized, step 116 through step 122 may be repeated in an iterative fashion until method 100 achieves the level of model accuracy.

FIG. 11 is a flow chart of an embodiment of a method 200 for determining primary first principle characteristics 106 as described in FIG. 10. At step 202, method 200 determines the effect of each characteristic on the variation in the Target Variable between measurable systems. In one embodiment, the method may be iteratively repeated, and a comparative analysis model can be used to determine the effect of each characteristic. In another embodiment, method 200 may use a correlation matrix. The effect of each characteristic may be expressed as a percentage of the total variation in the Target Variable in the initial data set. At step 204, method 200 may rank each characteristic from highest to lowest based on its effect on the Target Variable. Persons of ordinary skill in the art are aware that method 200 could use other ranking criteria.

At step 206, the characteristics may be grouped into one or more categories. In one embodiment, the characteristics are grouped into three categories. The first category contains characteristics that affect a Target Variable at a percentage less than a lower threshold (for example, about five percent). The second category may comprise one or more characteristics with a percentage between the lower percentage and a second threshold (for example, about 5% and about 20%). The third category may comprise one or more characteristics with a percentage over the second threshold (for example, about 20%). Other embodiments of method 200 at step 2006 may include additional or fewer categories and/or different ranges.

At step 208, method 200 may remove characteristics from a list of characteristics with Target Variable average variations below a specific threshold. For example, method 200 could remove characteristics that include first category described above in step 206 (e.g., characteristics with a percentage of less than about five percent). Persons of ordinary skill in the art are aware that other thresholds could be used, and multiple categories could be removed from the list of characteristics. In one embodiment, if characteristics are removed, the process may repeat at step 202 above. In another embodiment, no characteristics are removed from the list until determining whether another co-variant relationship exists, as described in step 212 below.

At step 210, method 200 determines the relationships between the mid-level characteristics. Mid-level characteristics are characteristics that have a certain level of effect on the Target Variable, but individually do not influence the Target Variable in a significant manner. Using the illustrative categories, those characteristics in the second category are mid-level characteristics. Example relationships between the characteristics are co-variant, dependent, and independent. A co-variant relationship occurs when modifying one characteristic causes the Target Variable to vary, but only when another characteristic is present. For instance, in the scenario where characteristic "A" is varied, which causes the Target Variable to vary, but only when characteristic "B" is present, then "A" and "B" have a co-variant relationship. A dependent relationship occurs when a characteristic is a derivative of or directly related to another characteristic. For instance, when the characteristic "A" is only present when characteristic "B" is present, then A and B have a dependent relationship. For those characteristics that are not co-variant or dependent, they are categorized as having independent relationships.

At step 212, method 200 may remove dependencies and high correlations in order to resolves characteristics displaying dependence with each other. There are several potential methods for resolving dependencies. Some examples include: (i) grouping multiple dependent characteristics into a single characteristic, (ii) removing all but one of the dependent characteristics, and (iii) keeping one of the dependent characteristics, and creating a new characteristic that is the difference between the kept characteristic and the other characteristics. After method 200 removes the dependencies, the process may be repeated from step 202. In one embodiment, if the difference variable is insignificant it can be removed from the analysis in the repeated step 208.

At step 214, method 200 may analyze the characteristics to determine the extent of the inter-relationships. In one embodiment, if any of the previous steps resulted in repeating the process, the repetition should be conducted prior to step 214. In some embodiments, the process may be repeated multiple times before continuing to step 214. At 216, the characteristics that result in less than a minimum threshold change in the impact on Target Variable variation caused by another characteristic are dropped from the list of potential characteristics. An illustrative threshold could be about 10 percent. For instance, if the variation in Target Variable caused by characteristic "A" is increased when characteristic "B" is present, the percent increase in the Target Variable variation caused by the presence of characteristic "B" must be estimated. If the variation of characteristic "B" is estimated to increase the variation in the Target Variable by less than about 10% of the increase caused by characteristic "A" alone, characteristic "B" can be eliminated from the list of potential characteristics. Characteristic "A" can also be deemed then to have an insignificant impact on the Target Variable. The remaining characteristics are deemed to be the primary characteristics.

FIG. 12 is a flow chart of an embodiment of a method 300 for developing constraints for use in solving the comparative analysis model as described in step 116 in FIG. 10. Constraints are developed on the model coefficients at step 302. In other words, constraints are any limits placed on model coefficients. For example, a model coefficient may have a constraint of a maximum of about 20% effect on contributing to a target variable. At step 354, method 300's objective function, as described below, is optimized to determine an initial set of model coefficients. At step 306, method 300 may calculate the percent contribution of each characteristic to the Target Variable. There are several methods of calculating the percent contribution of each characteristic, such as the "Average Method" described in as described in U.S. Pat. No. 7,233,910.

With the individual percent contributions developed, method 300 proceeds to step 308, where each percent contribution is compared against expert knowledge. Domain experts may have an intuitive or empirical feel for the relative impacts of key characteristics to the overall target value. The contribution of each characteristic is judged against this expert knowledge. At step 310, method 300 may make a decision about the acceptability of the individual contributions. If the contribution is found to be unacceptable the method 300 continues to step 312. If the contribution is found to be acceptable the method 300 continues to step 316.

At step 312, method 300 makes a decision on how to address or handle unacceptable results of the individual contributions. At step 312, the options may include adjusting the constraints on the model coefficients to affect a solution or deciding that the characteristic set chosen cannot be helped through constraint adjustment. If the user decides to accept the constraint adjustment then method 300 proceeds to step 316. If the decision is made to achieve acceptable results through constraint adjustment then method 300 continues to step 314. At step 314, the constraints are adjusted to increase or decrease the impact of individual characteristics in an effort to obtain acceptable results from the individual contributions. Method 300 continues to step 302 with the revised constraints. At step 316, peer and expert review of the model coefficients developed may be performed to determine the acceptability of the model coefficients developed. If the factors pass the expert and peer review, method 300 continues to step 326. If the model coefficients are found to be unacceptable, method 300 continues to step 318.

At step 318, method 300 may obtain additional approaches and suggestions for modification of the characteristics developed by working with experts in the particular domain. This may include the creation of new or updated developed characteristics, or the addition of new or updated first principle characteristics to the analysis data set. At step 320, a determination is made as to whether data exists to support the investigation of the approaches and suggestions for modification of the characteristics. If the data exists, method 300 proceeds to step 324. If the data does not exist, method 300 proceeds to step 322. At step 322, method 300 collects additional data in an effort to make the corrections required to obtain a satisfactory solution. At step 324, method 300 revises the set of characteristics in view of the new approaches and suggestions. At step 326, method 400 may document the reasoning behind the selection of characteristics. The documentation can be used in explaining results for use of the model coefficients.

Figure 13:
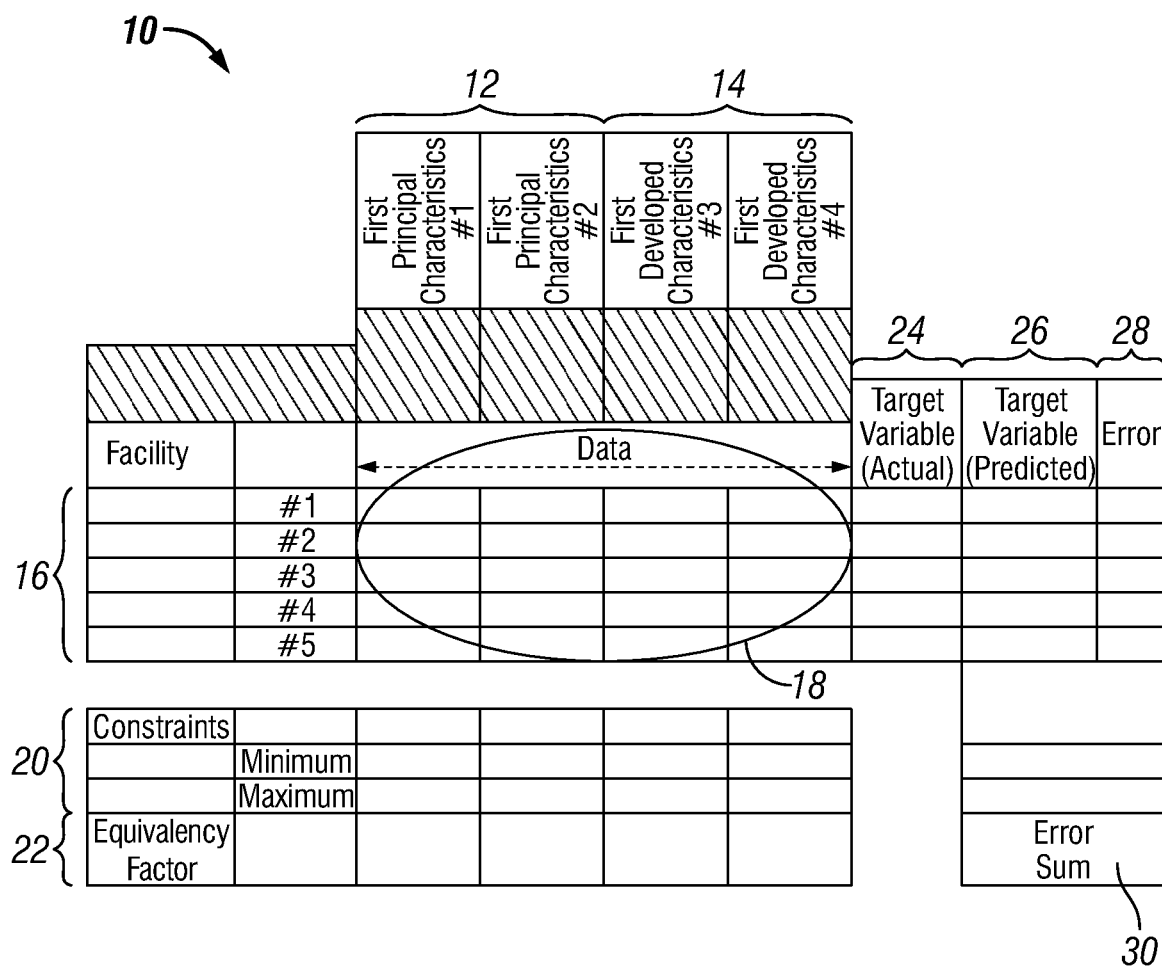
FIG. 13 is a schematic diagram of an embodiment of a model coefficient matrix for determining model coefficients as described in FIGS. 10-12.

FIG. 13 is a schematic diagram of an embodiment of a model coefficient matrix 10 for determining model coefficients as described in FIGS. 10-12. While model coefficient matrix 10 can be expressed in a variety of configurations, in this particular example, the model coefficient matrix 10 may be construed with the first principle characteristics 12 and first developed characteristics 14 on one axis, and the different facilities 16 for which data has been collected on the other axis. For each first principle characteristic 12 at each facility 16, there is the actual data value 18. For each first principle characteristic 12 and developed characteristic 14, there is the model coefficient 22 that will be computed with an optimization model. The constraints 20 limit the range of the model coefficients 22. Constraints can be minimum or maximum values, or other mathematical functions or algebraic relationships. Moreover, constraints 20 can be grouped and further constrained. Additional constraints 20 on facility data, and relationships between data points similar to those used in the data validation step, and constraints 20 can employ any mathematical relationship on the input data can also be employed. In one embodiment, the constraints 20 to be satisfied during optimization apply only to the model coefficients.

The Target Variable (actual) column 24 comprises actual values of the Target Variable as measured for each facility. The Target Variable (predicted) column 26 comprises the values for the target value as calculated using the determined model coefficients. The error column 28 comprises the error values for each facility as determined by the optimization model. The error sum 30 is the summation of the error values in error column 28. The optimization analysis, which comprises the Target Variable equation and an objection function, solves for the model coefficients to minimize the error sum 30. In the optimization analysis, the model coefficients $\alpha_j$ are computed to minimize the error $\epsilon_i$ over all facilities. The non-linear optimization process determines the set of model coefficients that minimizes this equation for a given set of first principle characteristics, constraints, and a selected value.

The Target Variable may be computed as a function of the characteristics and the to-be-determined model coefficients. The Target Variable equation is expressed as:

$$\text{Target Variable equation: } TV_i = \sum_j \alpha_j f(\text{characteristic})_{ij} + \varepsilon_i$$

where $TV_i$ represents the measured Target Variable for facility i; the characteristic variable represents a first principle characteristic; f is either a value of the first principle characteristic or a developed principle characteristic; i represents the facility number; j represents the characteristic number; $\alpha_j$ represents the jth model coefficient, which is consistent with the jth principle characteristic; and $\epsilon_i$ represents the error of the model's TV prediction as defined by the actual Target Variable value minus the predicted Target Variable value for facility i.

The objective function has the general form:

$$\text{Objective Function: Min} \left[ \sum_{i=1}^{m} |\epsilon_i|^p \right]^{1/p}, p \geq 1$$

where i is the facility; m represents the total number of facilities; and p represents a selected value One common usage of the general form of objective function is to minimize the absolute sum of error by using p=1 as shown below:

$$\text{Objective Function: Min} \left[ \sum_{i=1}^{m} |\epsilon_i| \right]$$

Another common usage of the general form of objective function is using the least squares version corresponding to p=2 as shown below:

$$\text{Objective Function: Min} \left[ \sum_{i=1}^{m} |\epsilon_i|^2 \right]^{1/2}$$

Since the analysis involves a finite number of first principle characteristics and the objective function form corresponds to a mathematical norm, the analysis results are not dependent on the specific value of p. The analyst can select a value based on the specific problem being solved or for additional statistical applications of the objective function. For example, p=2 is often used because of its statistical application in measuring data and Target Variable variation and Target Variable prediction error.

A third form of the objective function is to solve for the simple sum of errors squared as given in Equation 5 below.

$$\text{Objective Function: Min} \left[ \sum_{i=1}^{m} |\epsilon_i|^2 \right]$$

While several forms of the objective function have been shown, other forms of the objective function for use in specialized purposes could also be used. Under the optimization analysis, the determined model coefficients are those model coefficients that result in the least difference between the summation and the actual value of the Target Variable after the model iteratively moves through each facility and characteristic such that each potential model coefficient, subject to the constraints, is multiplied against the data value for the corresponding characteristic and summed for the particular facility.

For illustrative purposes, a more specific example of the one or more embodiments used to determine model coefficients for use in comparative performance analysis as illustrated in FIGS. 10-12 is discussed below. A Cat Cracker may be a processing unit in most petroleum refineries. A Cat Cracker cracks long molecules into shorter molecules within the gasoline boiling range and lighter. The process is typically conducted at relatively high temperatures in the presence of a catalyst. In the process of cracking the feed, coke is produced and deposited on the catalyst. The coke is burned off the catalyst to recover heat and to reactivate the catalyst. The Cat Cracker has several main sections: Reactor, Regenerator, Main Fractionator, and Emission Control Equipment. Refiners may desire to compare the performance of their Cat Crackers to the performance of Cat Crackers operated by their competitors. The example of comparing different Cat Cracker example and may not represent the actual results of applying this methodology to Cat Crackers, or any other industrial facility. Moreover, the Cat Cracker example is but one example of many potential embodiments used to compare measurable systems.

Using FIG. 10 as an example, method 100 starts at step 102 and determines that the Target Variable will be "Cash Operating Costs" or "Cash OPEX" in a Cat Cracker facility. At step 104, the first principle characteristics that may affect Cash Operating Costs for a Cat Cracker may include one or more of the following: (1) feed quality; (2) regenerator design; (3) staff experience; (4) location; (5) age of unit; (6) catalyst type; (7) feed capacity; (8) staff training; (9) trade union; (10) reactor temperature; (11) duplicate equipment; (12) reactor design; (13) emission control equipment; (14) main fractionator design; (15) maintenance practices; (16) regenerator temperature; (17) degree of feed preheat; (18) staffing level.

To determine the primary characteristics, method 100 may at step 106 determine the effects of the first characteristics. In one embodiment, method 100 may implement step 106 by determining primary characteristics as shown in FIG. 11. In FIG. 11, at step 202, method 200 may assign a variation percentage for each characteristic. At step 204, method 200 may rate and rank the characteristics from the Cat Cracker Example. The following chart shows the relative influence and ranking for at least some of the example characteristics in Table 1:

TABLE 1

| Characteristics | Category | Comment |
|---|---|---|
| Feed Quality | 3 | Several aspects of feed quality are key |
| Catalyst Type | 3 | Little effect on costs, large impact on yields |
| Reactor Design | 1 | Several key design factors are key |
| Regenerator Design | 3 | Several design factors are key |
| Staffing Levels | 2 | |
| Feed Capacity | 1 | Probably single-most highest impact |
| Emission Control Equipment | 2 | Wet versus dry is a key difference |
| Staff Experience | 3 | Little effect on costs |
| Staff Training | 2 | Little effect on costs |
| Main Fractionator Design | 3 | Little effect on costs, large impact on yields |
| Location | 3 | Previous data analysis shows this characteristic has little effect on costs |
| Trade Union | 3 | Previous data analysis shows this characteristic has little effect on costs |
| Maintenance Practices | 2 | Effect on reliability and "lost opportunity cost" |
| Age of Unit | 2 | Previous data analysis shows this characteristic has little effect on costs |
| Reactor Temperature | 3 | Little effect on costs |

TABLE 1-continued

| Characteristics | Category | Comment |
| --- | --- | --- |
| Regenerator Temperature | 3 | Little effect on costs |
| Duplicate Equipment | 3 | Little effect on costs |

In this embodiment, the categories are as follows as shown in Table 2:

TABLE 2

| | Percent of Average Variation in the Target Variable Between Facilities |
| --- | --- |
| Category 1 (Major Characteristics) | >20% |
| Category 2 (Midlevel Characteristics) | 5-20% |
| Category 3 (Minor Characteristics) | <5% |

Other embodiments could have any number of categories and that the percentage values that delineate between the categories may be altered in any manner.

Based on the above example rankings, method 200 groups the characteristics according to category at step 206. At step 208, method 200 may discard characteristics in Category 3 as being minor. Method 200 may analyze characteristics in Category 2 to determine the type of relationship they exhibit with other characteristics at step 210. Method 200 may classify each characteristic as exhibiting either co-variance, dependence, or independence at step 212. Table 3 is an example of classifying the characteristics of the Cat Cracker facility:

TABLE 3

Classification of Category 2 Characteristics
Based on Type of Relationship

| Category 2 characteristics | Type of Relationship | If Co-variant or Dependent, Related Partner(s) |
| --- | --- | --- |
| Staffing Levels | Independent | |
| Emission Equipment | Co-variant | Maintenance Practice |
| Maintenance Practices | Co-variant | Staff Experience |
| Age of Unit | Dependent | Staff Training |
| Staff Training | Co-variant | Maintenance Practice |

At step 214, method 200 may analyze the degree of the relationship of these characteristics. Using this embodiment for the Cat Cracker example: staffing levels, which is classified as having an independent relationship, may stay in the analysis process. Age of Unit is classified as having a dependent relationship with Staff Training. A dependent relationship means Age of Unit is a derivative of Staff Experience or vice versa. After further consideration, method 200 may decide to drop the Age of Unit characteristic from the analysis and the broader characteristic of Staff Training may remain in the analysis. The three characteristics classified as having a co-variant relationship, Staff Training, Emission Equipment, Maintenance Practices, must be examined to determine the degree of co-variance.

Method 200 may determine that the change in Cash Operating Costs caused by the variation in Staff Training may be modified by more than 30% by the variation in Maintenance Practices. Along the same lines, the change in Cash Operating Costs caused by the variation in Emission Equipment may be modified by more than 30% by the variation in Maintenance Practices causing Maintenance Practices, Staff Training and Emission Equipment to be retained in the analysis process. Method 200 may also determine that the change in Cash Operating Costs caused by the variation in Maintenance Practice is not modified by more than the selected threshold of 30% by the variation in Staff Experience causing Staff Experience to be dropped from the analysis.

Continuing with the Cat Cracker example and returning to FIG. 10, method 100 categorizes the remaining characteristics as continuous, ordinal or binary type measurement in step 108 as shown in Table 4.

TABLE 4

Classification of Remaining characteristics
Based on Measurement Type

| Remaining characteristics | Measurement Type |
| --- | --- |
| Staffing Levels | Continuous |
| Emission Equipment | Binary |
| Maintenance Practices | Ordinal |
| Staff Training | Continuous |

In this Cat Cracker example, Maintenance Practices may have an "economy of scale" relationship with Cash Operating Costs (which is the Target Variable). An improvement in Target Variable improves at a decreasing rate as Maintenance Practices Improve. Based on historical data and experience, a complexity factor is assigned to reflect the economy of scale. In this particular example, a factor of 0.6 is selected. As an example of coefficients, the complexity factor is often estimated to follow a power curve relationship. Using Cash Operating Costs as an example of a characteristic that typically exhibits an "economy of scale;" the effect of Maintenance Practices can be described with the following:

$$\text{Target Variable}_{facility\ A} = \left( \frac{Capacity_{facility\ A}}{Capacity_{facility\ B}} \right)^{ComplexityFactor} * \text{Target Variable}_{facility\ B}$$

At step 110, method 100 may develop a data collection classification system. In this example, a questionnaire may be developed to measure how many of ten key Maintenance Practices are in regular use at each facility. A system of definitions may be used such that the data is collected in a consistent manner. The data in terms of number of Maintenance Practices in regular use is converted to a Maintenance Practices Score using the 0.6 factor and "economy of scale" relationship as illustrated in Table 5.

TABLE 5

Maintenance Practices Score

| Number Maintenance Practices In Regular Use | Maintenance Practices Score |
| --- | --- |
| 1 | 1.00 |
| 2 | 1.52 |
| 3 | 1.93 |
| 4 | 2.30 |
| 5 | 2.63 |
| 6 | 2.93 |
| 7 | 3.21 |
| 8 | 3.48 |

TABLE 5-continued

Maintenance Practices Score

| Number Maintenance Practices In Regular Use | Maintenance Practices Score |
|---|---|
| 9 | 3.74 |
| 10 | 3.98 |

For illustrative purposes with respect to the Cat Cracker example, at step 112, method 100 may collect data and at step 114, method 100 may validate the data as shown in Table 6:

TABLE 6

Cat Cracker Data

| Unit of Measurement | Reactor Design Score | Staff Training Man Weeks | Staffing Levels Number People | Emission Equipment Yes = 1 No = 0 | Feed Capacity Barrels per Day | Maintenance Practices Score | Cash Operating Cost Dollars per Barrel |
|---|---|---|---|---|---|---|---|
| Facility #1 | 1.50 | 30 | 50 | 1 | 45 | 3.74 | 3.20 |
| Facility #2 | 1.35 | 25 | 28 | 1 | 40 | 2.30 | 3.33 |
| Facility #3 | 1.10 | 60 | 8 | 0 | 30 | 1.93 | 2.75 |
| Facility #4 | 2.10 | 35 | 23 | 1 | 50 | 3.74 | 4.26 |
| Facility #5 | 1.00 | 25 | 5 | 0 | 25 | 2.63 | 2.32 |

Constraint ranges were developed for each characteristic by an expert team to control the model so that the results are within a reasonable range of solutions as shown in Table 7.

TABLE 7

Cat Cracker Model Constraint Ranges

| | Reactor Design | Staff Training | Staffing Levels | Emission Equipment | Maintenance Practices | Feed Capacity |
|---|---|---|---|---|---|---|
| Minimum | −3.00 | −3.00 | −1.0 | −1.0 | 0.0 | 0.0 |
| Maximum | 0.00 | 1.00 | 40 | 0.0 | 4.0 | 4.0 |

At step 116, method 100 produces the results of the model optimization runs, which are shown below in Table 8.

TABLE 8

Model Results

| Characteristics | Equivalency Factors |
|---|---|
| Reactor Design | −0.9245 |
| Staff Training | −0.0021 |
| Staffing Levels | −0.0313 |
| Emission Equipment | 0.0000 |
| Maintenance Practices | 0.0000 |
| Feed Capacity | 0.1382 |

The model indicates Emission Equipment and Maintenance Practices are not significant drivers of variations in Cash Operating Costs between different Cat Crackers. The model may indicate this by finding about zero values for model coefficients for these two characteristics. Reactor Design, Staff Training, and Emission Equipment are found to be significant drivers. In the case of both Emission Equipment and Maintenance Practices, experts may agree that these characteristics may not be significant in driving variation in Cash Operating Cost. The experts may determine that a dependence effect may not have been previously identified that fully compensates for the impact of Emission Equipment and Maintenance Practices.

Figure 14:
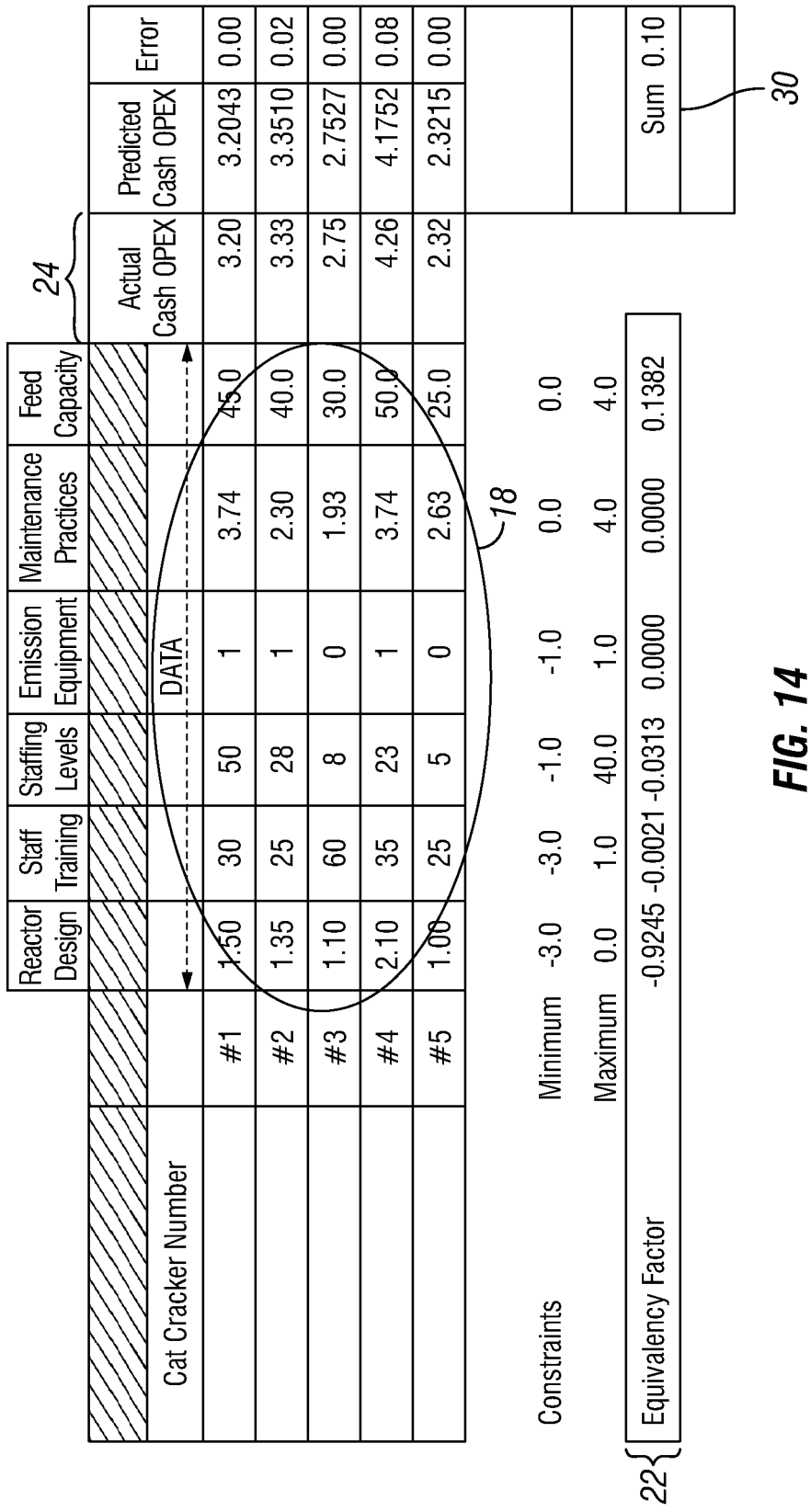
FIG. 14 is a schematic diagram of an embodiment of a model coefficient matrix with respect to a fluidized catalytic cracking unit (Cat Cracker) for determining model coefficients for use in comparative performance analysis as illustrated in FIGS. 10-12.
Figure 16:
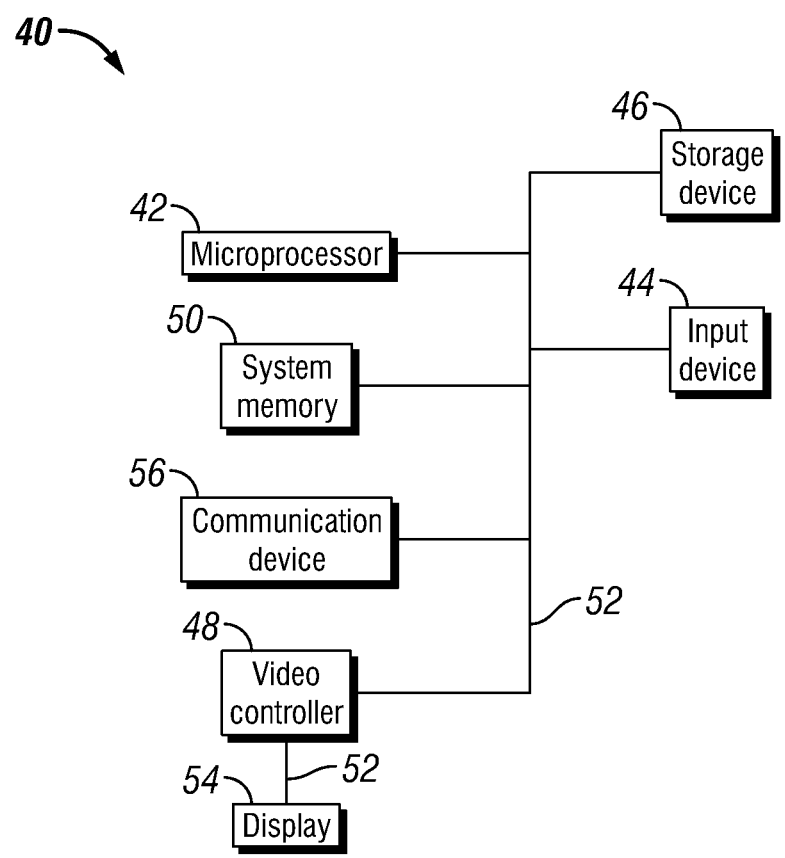
FIG. 16 is a schematic diagram of another embodiment of a computing node for implementing one or more embodiments.

FIG. 14 is a schematic diagram of an embodiment of a model coefficient matrix 10 with respect to the Cat Cracker for determining model coefficients for use in comparative performance analysis as illustrated in FIGS. 10-12. A sample model configuration for the illustrative Cat Cracker example is shown in FIG. 14. The data 18, actual values 24, and the resulting model coefficients 22 are shown. In this example, the error sum 30 is relatively minimal, so developed characteristics are not necessary in this instance. In other examples, an error sum of differing values may be determined to be significant resulting in having to determine developed characteristics.

For additional illustrative purposes, another example for determining model coefficients for use in comparative performance analysis as illustrated in FIGS. 10-12 is discussed below. The embodiment will relate to pipelines and tank farms terminals. Pipelines and tank farms are assets used by industry to store and distribute liquid and gaseous feed stocks and products. The example is illustrative for development of equivalence factors for: (1) pipelines and pipeline systems; (2) tank farm terminals; and (3) any combination of pipelines, pipeline systems and tank farm terminals. The example is for illustrative purposes and may not represent the actual results of applying this methodology to any particular pipeline and tank farm terminal, or any other industrial facility.

Using FIG. 10 as an example, method 100 *t*, at step 102, selects the desired Target Variable to be "Cash Operating Costs" or "Cash OPEX" in a pipeline asset. For step 104, the first principle characteristics that may affect Cash Operating Costs may include for the pipe related characteristics: (1) type of fluid transported; (2) average fluid density; (3) number of input and output stations; (4) total installed capacity; (5) total main pump driver kilowatt (KW); (6) length of pipeline; (7) altitude change in pipeline; (8) total utilized capacity; (9) pipeline replacement value; and (10)

pump station replacement value. The first principle characteristics that may affect Cash Operating Costs may include for the tank related characteristics include: (1) fluid class; (2) number of tanks; (3) total number of valves in terminal; (4) total nominal tank capacity; (5) annual number of tank turnovers; and (6) tank terminal replacement value.

To determine the primary first principle characteristics, method 100 determines the effect of the first characteristics at step 106. In one embodiment, method 100 may implement step 106 by determining primary characteristics as shown in FIG. 11. In FIG. 11, at step 202, method 100 may for each characteristic assign an impact percentage. This analysis shows that the pipeline replacement value and tank terminal replacement value may be used widely in the industry and are characteristics that are dependent on more fundamental characteristics. Accordingly, in this instance, those values are removed from consideration for primary first principle characteristics. At step 204, method 200 may rate and rank the characteristics. Table 9 shows the relative impact and ranking for the example characteristics method 200 may assign a variation percentage for each characteristic.

TABLE 9

| Characteristics | Category | Comment |
|---|---|---|
| Type of Fluid Transported | 2 | products and crude |
| Average Fluid Density | 3 | affects power consumption |
| Number of Input and Output Stations | 1 | more stations means more cost |
| Total Installed Capacity | 3 | surprisingly minor affect |
| Total Main Pump Driver KW | 1 | power consumption |
| Length of pipeline | 3 | no affect |
| Altitude change in pipeline | 3 | small affect by related to KW |
| Total Utilized Capacity | 3 | no effect |
| Pipeline Replacement Value | 3 | industry standard has no effect |
| Pump Station Replacement Value | 3 | industry standard has little effect |
| Fluid Class | 3 | no effect |
| Number of Tanks | 2 | important tank farm parameter |
| Total Number of Valves in Terminal | 3 | no effect |
| Total Nominal Tank Capacity | 2 | important tank farm parameter |
| Annual Number of Tank Turnovers | 3 | no effect |
| Tank Terminal Replacement Value | 3 | industry standard has little effect |

In this embodiment, the categories are as follows as shown in Table 10:

TABLE 10

| | PerCent of Average Variation in the Target Variable Between Facilities |
|---|---|
| Category 1 (Major Characteristics) | >1.5% |
| Category 2 (Midlevel Characteristics) | 7-15% |
| Category 3 (Minor Characteristics) | <7% |

Other embodiments could have any number of categories and that the percentage values that delineate between the categories may be altered in any manner.

Based on the above example rankings, method 200 groups the characteristics according to category at step 206. At step 208, method 200 discards those characteristics in Category 3 as being minor. Method 200 may further analyze the characteristics in Category 2 to determine the type of relationship they exhibit with other characteristics at step 210. Method 200 classifies each characteristic as exhibiting either co-variance, dependence or independence as show below in Table 11:

TABLE 11

Classification of Category 2 Characteristics Based on Type of Relationship

| Category 2 characteristics | Type of Relationship | If Co-variant or Dependent, Related Partner(s) |
|---|---|---|
| Type of Fluid Transported | Independent | |
| Number of Input and Output Stations | Independent | |
| Total Main Pump Driver KW | Independent | |
| Number of Tanks | Independent | |
| Total Nominal Tank Capacity | Independent | |

At step 212, method 200 may resolve the dependent characteristics. In this example, there are no dependent characteristics that method 200 needs to resolve. At step 214, method 200 may analyze the degree of the co-variance of the remaining characteristics and determine that no characteristics are dropped. Method 200 may deem the remaining variables as primary characteristics in step 218.

Continuing with the Pipeline and Tank Farm example and returning to FIG. 10, method 100 may categorize the remaining characteristics as continuous, ordinal or binary type measurement at step 108 as shown in Table 12.

TABLE 12

Classification of Remaining characteristics Based on Measurement Type

| Remaining characteristics | Measurement Type |
|---|---|
| Type of Fluid Transported | Binary |
| Number of Input and Output Stations | Continuous |
| Total Main Pump Driver KW | Continuous |
| Number of Tanks | Continuous |
| Total Nominal Tank Capacity | Continuous |

At step 110, method 100 may develop a data collection classification system. In this example a questionnaire may be developed to collect information from participating facilities on the measurements above. At step 112, method 100 may collect the data and at step 114, method 100 may validate the data as shown in Tables 13 and 14.

TABLE 13

Pipe Line and Tank Farm Data

| Characteristic Measurement Units | Type of Fluid 1 = Product 2 = Crude | Number of Input and Output Stations Count | Total Main PumpDriver KW | Number of Tanks Count | Total Nominal Tank Capacity KMT |
|---|---|---|---|---|---|
| Facility 1 | 1 | 8 | 74.0 | 34 | 1,158 |
| Facility 2 | 2 | 16 | 29.0 | 0 | 0 |
| Facility 3 | 1 | 2 | 5.8 | 7 | 300 |
| Facility 4 | 1 | 5 | 4.9 | 6 | 490 |
| Facility 5 | 1 | 2 | 5.4 | 8 | 320 |
| Facility 6 | 2 | 2 | 2.5 | 33 | 191 |
| Facility 7 | 1 | 3 | 8.2 | 0 | 0 |
| Facility 8 | 2 | 2 | 8.7 | 0 | 0 |
| Facility 9 | 1 | 3 | 15.0 | 10 | 180 |
| Facility 10 | 1 | 9 | 12.0 | 22 | 860 |
| Facility 11 | 1 | 4 | 20.0 | 5 | 206 |
| Facility 12 | 2 | 9 | 9.3 | 0 | 0 |
| Facility 13 | 2 | 12 | 6.2 | 0 | 0 |

TABLE 14

Pipe Line and Tank Farm Data

| Characteristic Measurement Units | Type of Fluid 1 = Product 2 = Crude | Number of Input and Output Stations Count | Total Main Pump Driver KW | Number of Tanks Count | Total Nominal Tank Capacity KMT |
|---|---|---|---|---|---|
| Facility 14 | 1 | 5 | 41.4 | 19 | 430 |
| Facility 15 | 2 | 8 | 8.2 | 0 | 0 |
| Facility 16 | 1 | 8 | 96.8 | 31 | 1,720 |
| Facility 17 | 1 | 2 | 15.0 | 8 | 294 |

In step 116, method 100 may develop constraints on the model coefficients by the expert as shown below in Table 15.

TABLE 15

| | Type of Fluid | Number of Input and Output Stations | Total Main Pump Driver | Number of Tanks | Total Nominal Tank Capacity |
|---|---|---|---|---|---|
| Minimum | 0 | 0 | 0 | 134 | 0 |
| Maximum | 2000 | 700 | 500 | 500 | 100 |

At step 116, method 100 produces the results of the model optimization runs, which are shown below in Table 16.

TABLE 16

Model Results

| Characteristics | Equivalency Factors |
|---|---|
| Type of Fluid Transported | 1301.1 |
| Number of Input and Output Stations | 435.4 |
| Total Main Pump Driver KW | 170.8 |
| Number of Tanks | 134.0 |
| Total Nominal Tank Capacity | 6.11 |

In step 118, method 100 may determine that there is no need for developed characteristics in this example. The final model coefficients may include model coefficients determined in the comparative analysis model step above.

FIG. 15 is a schematic diagram of an embodiment of a model coefficient matrix 10 with respect to the pipeline and tank farm for determining model coefficients for use in comparative performance analysis as illustrated in FIGS. 10-12. This example shows but one of many potential applications of this invention to the pipeline and tank farm industry. The methodology described and illustrated in FIGS. 10-15 could be applied to many other different industries and facilities. For example, this methodology could be applied to the power generation industry, such as developing model coefficients for predicting operating expense for single cycle and combined cycle generating stations that generate electrical power from any combination of boilers, steam turbine generators, combustion turbine generators and heat recovery steam generators. In another example, this methodology could be applied to develop model coefficients for predicting the annual cost for ethylene manufacturers of compliance with environmental regulations associated with continuous emissions monitoring and reporting from ethylene furnaces. In one embodiment, the model coefficients would apply to both environmental applications and chemical industry applications.

Figure 9:
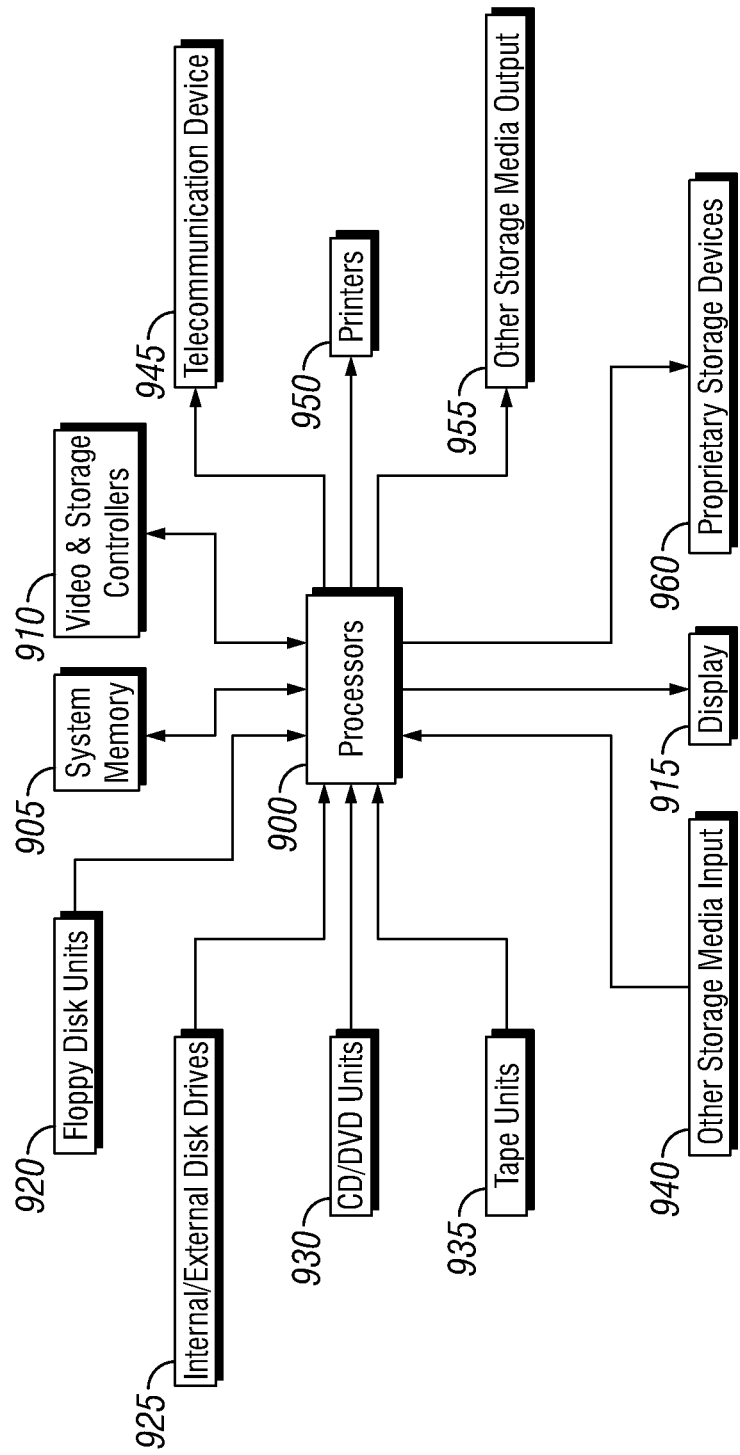
FIG. 9 is a schematic diagram of an embodiment of a computing node for implementing one or more embodiments.

FIG. 9 is a schematic diagram of an embodiment of a computing node for implementing one or more embodiments described in this disclosure, such as method 60, 100, 200, and 300 as described in FIGS. 1 and 10-12, respectively. The computing node may correspond to or may be part of a computer and/or any other computing device, such as a handheld computer, a tablet computer, a laptop computer, a portable device, a workstation, a server, a mainframe, a super computer, and/or a database. The hardware comprises of a processor 900 that contains adequate system memory 905 to perform the required numerical computations. The processor 900 executes a computer program residing in system memory 905, which may be a non-transitory computer readable medium, to perform the methods 60, 100, 200, and 300 as described in FIGS. 1 and 10-12, respectively. Video and storage controllers 910 may be used to enable the operation of display 915 to display a variety of information, such as the tables and user interfaces described in FIGS. 2-8. The computing node includes various data storage devices for data input such as floppy disk units 920, internal/external disk drives 925, internal CD/DVDs 930, tape units 935, and other types of electronic storage media 940. The aforementioned data storage devices are illustrative and exemplary only.

The computing node may also comprise one or more other input interfaces (not shown in FIG. 9) that comprise at least one receiving device configured to receive data via electrical, optical, and/or wireless connections using one or more communication protocols. In one embodiment, the input interface may be a network interface that comprises a plurality of input ports configured to receive and/or transmit data via a network. In particular, the network may transmit operation and performance data via wired links, wireless link, and/or logical links. Other examples of the input interface may include but are not limited to a keyboard, universal serial bus (USB) interfaces and/or graphical input devices (e.g., onscreen and/or virtual keyboards). In another embodiment, the input interfaces may comprise one or more measuring devices and/or sensing devices for measuring asset unit first principle data or other asset-level data 64 described in FIG. 1. In other words, a measuring device and/or sensing device may be used to measure various physical attributes and/or characteristics associated with the operation and performance of a measurable system.

These storage media are used to enter data set and outlier removal criteria into to the computing node, store the outlier removed data set, store calculated factors, and store the system-produced trend lines and trend line iteration graphs. The calculations can apply statistical software packages or can be performed from the data entered in spreadsheet formats using Microsoft Excel®, for example. In one embodiment the calculations are performed using either customized software programs designed for company-specific system implementations or by using commercially available software that is compatible with Microsoft Excel® or other database and spreadsheet programs. The computing node can also interface with proprietary or public external storage media 955 to link with other databases to provide data to be used with the future reliability based on current maintenance spending method calculations. An output interface comprises an output device for transmitting data. The output devices can be a telecommunication device 945, a transmission device, and/or any other output device used to transmit the processed future reliability data, such as the calculation data worksheets, graphs and/or reports, via one or more networks, an intranet or the Internet to other computing nodes, network nodes, a control center, printers 950, electronic storage media similar to those mentioned as input devices 920, 925, 930, 935, 940 and/or proprietary storage databases 960. These output devices used herein are illustrative and exemplary only.

In one embodiment, system memory 905 interfaces with a computer bus or other connection so as to communicate and/or transmit information stored in system memory 905 to processor 900 during execution of software programs, such as an operating system, application programs, device drivers, and software modules that comprise program code, and/or computer executable process steps, incorporating functionality described herein, e.g., methods 60, 100, 200, and 300. Processor 900 first loads computer executable process steps from storage, e.g., system memory 905, storage medium/media, removable media drive, and/or other non-transitory storage devices. Processor 900 can then execute the stored process steps in order to execute the loaded computer executable process steps. Stored data, e.g., data stored by a storage device, can be accessed by processor 900 during the execution of computer executable process steps to instruct one or more components within the computing node.

Programming and/or loading executable instructions onto system memory 905 and/or one or more processing units, such as a processor or microprocessor, in order to transform a computing node 40 into a non-generic particular machine or apparatus that performs modelling used to estimate future reliability of a measurable system is well-known in the art. Implementing instructions, real-time monitoring, and other functions by loading executable software into a microprocessor and/or processor can be converted to a hardware implementation by well-known design rules and/or transform a general-purpose processor to a processor programmed for a specific application. For example, decisions between implementing a concept in software versus hardware may depend on a number of design choices that include stability of the design and numbers of units to be produced and issues involved in translating from the software domain to the hardware domain. Often a design may be developed and tested in a software form and subsequently transformed, by well-known design rules, to an equivalent hardware implementation in an ASIC or application specific hardware that hardwires the instructions of the software. In the same manner as a machine controlled by a new ASIC is a particular machine or apparatus, likewise a computer that has been programmed and/or loaded with executable instructions is viewed as a non-generic particular machine or apparatus.

FIG. 18 is a schematic diagram of another embodiment of a computing node 40 for implementing one or more embodiments within this disclosure, such as methods 60, 100, 200, and 300 as described in FIGS. 1 and 10-12, respectively. Computing node 40 can be any form of computing device, including computers, workstations, hand helds, mainframes, embedded computing device, holographic computing device, biological computing device, nanotechnology computing device, virtual computing device and or distributed systems. Computing node 40 includes a microprocessor 42, an input device 44, a storage device 46, a video controller 48, a system memory 50, and a display 54, and a communication device 56 all interconnected by one or more buses or wires or other communications pathway 52. The storage device 46 could be a floppy drive, hard drive, CD-ROM, optical drive, bubble memory or any other form of storage device. In addition, the storage device 42 may be capable of receiving a floppy disk, CD-ROM, DVD-ROM, memory stick, or any other form of computer-readable medium that may contain computer-executable instructions or data. Further communication device 56 could be a modem, network card, or any other device to enable the node to communicate with humans or other nodes.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it may be understood that the disclosed embodiments might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

In addition, the various embodiments described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

Although the systems and methods described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of this disclosure that variations and equivalents of the invention are within the scope of the claims while the description, abstract, and drawings are not to be used to limit the scope of the invention. The invention is specifically intended to be as broad as the claims below and their equivalents.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the disclosure.

What is claimed is:

1. A system for modelling future reliability of a facility based on operational and performance data, comprising:
    an input interface configured to:
        receive maintenance expense data corresponding to the facility;
        receive first principle data corresponding to the facility, wherein the first principle data comprises characteristics of a measurable system associated with the facility; and
        receive asset reliability data corresponding to the facility;
    a processor coupled to a non-transitory computer readable medium, wherein the non-transitory computer readable medium comprises instructions when executed by the processor causes the processor to:
        determine a target variable associated with the facility;
        obtain one or more comparative analysis models associated with the facility;
        utilize the one or more comparative analysis models to optimize constraints on maintenance activities based at least in part on the first principle data, the maintenance expense data and the asset reliability data;
        generate a maintenance standard associated with the facility based on the constraints on the maintenance activities;
        utilize the maintenance standard to generate a plurality of category values that categorizes the maintenance expense data by a designated interval based upon at least the maintenance expense data, the first principle data, and the one or more comparative analysis models;
        determine an estimated future reliability of the facility based on the asset reliability data and the plurality of category values;
        wherein, based on performance of the constraints on maintenance activities, the input interface receives, intermittently or continuously, current data for the first principle data to enable to the processor to utilize the one or more comparative analysis models and the maintenance standard to generate an updated estimated future reliability data of the measureable system; and
    a user interface configured to display:
        the constraints on the maintenance activities and
        the estimated future reliability of the facility.

2. The system of claim 1, wherein the asset reliability data is Equivalent Forced Outage Rate data.

3. The system of claim 1, wherein the instructions, when executed by the processor, further cause the processor to compile the at least one maintenance standard and the asset reliability data into a compiled data file.

4. The system of claim 3, wherein the instructions, when executed by the processor, further cause the processor to:
    generate a categorized time-based maintenance expense data based upon at least the compiled data file; and
    generate a categorized time-based asset reliability data based upon at least the compiled data file.

5. The system of claim 4, wherein the instructions, when executed by the processor, further cause the processor to generate the categorized time-based maintenance expense data by arranging the category values according to one or more time intervals for the facility.

6. The system of claim 4, wherein the instructions, when executed by the processor, further cause the processor to generate the categorized time-based asset reliability data by arranging asset reliability data values according to one or more time intervals for the facility.

7. The system of claim 1, wherein a future reliability interval of the estimated future reliability is based upon an amount of the maintenance expense data, the asset reliability data, and the first principle data.

8. The system of claim 1, wherein the at least one maintenance standard is utilized to normalize the maintenance expense data.

9. The system of claim 8, wherein the instructions, when executed by the processor, further cause the processor to normalize the maintenance expense data by generating a periodic maintenance spending divisor for a time period.

10. The system of claim 1, wherein the display of the estimated future reliability comprises a graph displaying the asset reliability data according to the plurality of category values.

11. A method, comprising:
receiving, by at least one processor, maintenance expense data corresponding to a facility;
receiving, by the at least one processor, first principle data corresponding to the facility, wherein the first principle data comprises characteristics of a measurable system associated with the facility;
receiving, by the at least one processor, asset reliability data corresponding to the facility;
determining, by the at least one processor, a target variable associated with the facility;
obtaining, by the at least one processor, one or more comparative analysis models associated with the facility;
utilizing, by the at least one processor, the one or more comparative analysis models to optimize constraints on maintenance activities based at least in part on the first principle data, the maintenance expense data and the asset reliability data;
generating, by the at least one processor, a maintenance standard associated with the facility based on the constraints on the maintenance activities;
utilizing, by the at least one processor, the maintenance standard to generate a plurality of category values that categorizes the maintenance expense data by a designated interval based upon at least the maintenance expense data, the first principle data, and the one or more comparative analysis models;
determining, by the at least one processor, an estimated future reliability of the facility based on the asset reliability data and the plurality of category values;
wherein, based on performance of the constraints on maintenance activities, the input interface receives, intermittently or continuously, current data for the first principle data to enable to the processor to utilize the one or more comparative analysis models and the maintenance standard to generate an updated estimated future reliability data of the measureable system; and
causing to display, by the at least one processor:
the constraints on the maintenance activities and
the estimated future reliability of the facility.

12. The method of claim 11, wherein the asset reliability data is Equivalent Forced Outage Rate data.

13. The method of claim 11, wherein the at least one maintenance standard is utilized to generate normalized maintenance expense data from the maintenance expense data and the one or more comparative analysis models.

14. The method of claim 13, further comprising:
generating the normalized maintenance expense data by generating a periodic maintenance spending divisor.

15. The method of claim 11, further comprising:
compiling the at least one maintenance standard and the asset reliability data into a compiled data file;
generating a categorized time-based maintenance expense data based upon at least the compiled data file; and
generating a categorized time-based asset reliability data based upon at least the compiled data file.

16. The method of claim 15, wherein the generating the categorized time-based maintenance expense data comprises arranging the category values according to one or more time intervals for the facility.

17. The apparatus of claim 15, wherein the generating the categorized time-based asset reliability data comprises arranging asset reliability data values according to one or more time intervals for the facility.

* * * * *